US 8,200,720 B2

(12) United States Patent
Harada

(10) Patent No.: US 8,200,720 B2
(45) Date of Patent: Jun. 12, 2012

(54) SYSTEM AND COMPUTER PROGRAM PRODUCT FOR FILE MANAGEMENT

(75) Inventor: Takaaki Harada, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 263 days.

(21) Appl. No.: 12/712,502

(22) Filed: Feb. 25, 2010

(65) Prior Publication Data
US 2010/0228746 A1 Sep. 9, 2010

(30) Foreign Application Priority Data

Mar. 4, 2009 (JP) ................................. 2009-051016

(51) Int. Cl.
*G06F 17/30* (2006.01)

(52) U.S. Cl. ......... 707/821; 707/752; 707/809; 345/625

(58) Field of Classification Search .................. 707/752, 707/805, 809, 821; 345/619, 625
See application file for complete search history.

(56) References Cited

U.S. PATENT DOCUMENTS

| 7,055,106 B2 * | 5/2006 | Shibata ........................ 715/837 |
| 7,155,454 B2 * | 12/2006 | Kondo ................................. 1/1 |
| 7,788,232 B2 * | 8/2010 | Ito .................................. 707/661 |
| 2008/0228937 A1 | 9/2008 | Araumi | |
| 2009/0222420 A1 | 9/2009 | Hirata | |

FOREIGN PATENT DOCUMENTS

JP 2006-268295 10/2006

OTHER PUBLICATIONS

U.S. Appl. No. 12/632,242, filed Dec. 7, 2009, Harada.

* cited by examiner

*Primary Examiner* — Cheryl Lewis
(74) *Attorney, Agent, or Firm* — Oblon, Spivak, McClelland, Maier & Neustadt, L.L.P.

(57) ABSTRACT

On a display unit of a client terminal, a to-be-uploaded folder and a to-be-uploaded file, a display area associated with computer program that provides uploading function, and the like are displayed. When a user operates a mouse and the like such that a pointer is placed on the to-be-uploaded file and performs a drag-and-drop operation into the display area, the to-be-uploaded file is uploaded to a file management server via a network.

4 Claims, 24 Drawing Sheets

FIG. 4

```
<?xml version="1.0" encoding="utf-8"?>
<placeMap updateTime="2007-08-10T12:54:00+09:00" preCurrentID="My place">
    <layer name="No Name" tag="">          ← 202
        <placeID="">
        <placeID="">
        <placeID="">
    </layer>                                 201
    <layer name="Favorite" tag="Favorite; Photos">
        <placeID="">
        <placeID="My place">
        <placeID="">
    </layer>
    <layer name="" tag="">
        <placeID="">
        <placeID="">
        <placeID="">
    </layer>
</placeMap>
```

FIG. 19
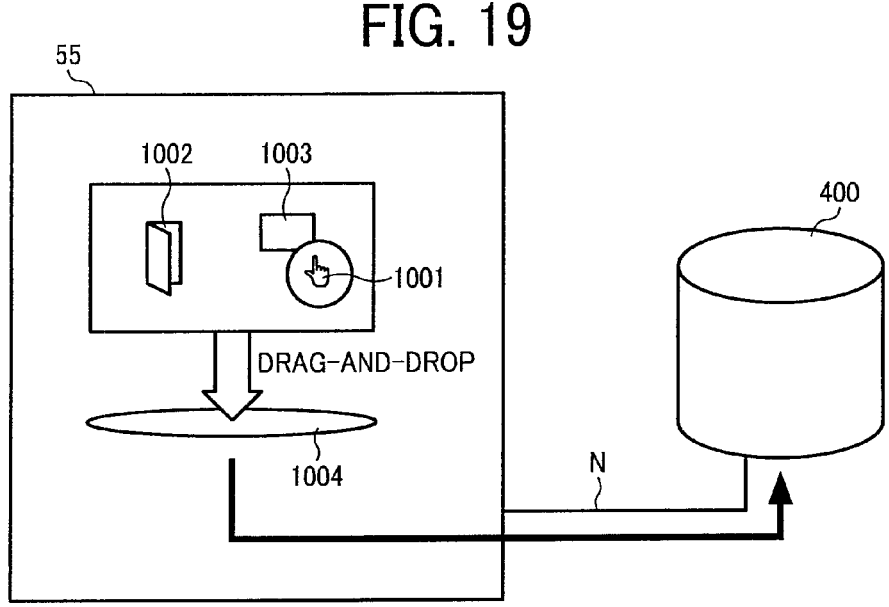
| FIG. 20A | FIG. 20B | FIG. 20C |
|---|---|---|
| DRAGGING IS STARTED | ANIMATION IS ACTIVATED WHEN ICON COMES NEARBY (DRAG OVER ICON IN PREDETERMINED AREA) | ANIMATION THAT REPRESENTS DROPPING OPERATION |
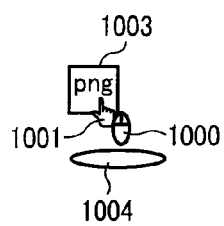 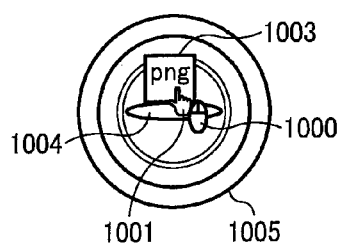 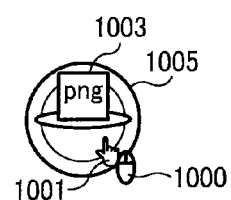
| FIG. 20D | FIG. 20E | FIG. 20F |
|---|---|---|
| LOOP ANIMATION | ANIMATION THAT REPRESENTS COMPLETION | NORMAL STATE |
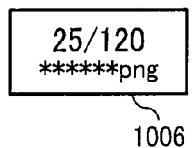 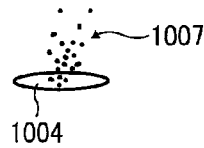 

THIS APPEARS WHEN ⊞ IS CLICKED

SLIDESHOW SCREEN

SYSTEM AND COMPUTER PROGRAM PRODUCT FOR FILE MANAGEMENT

CROSS-REFERENCE TO RELATED APPLICATIONS

The present application claims priority to and incorporates by reference the entire contents of Japanese Patent Application No. 2009-051016 filed in Japan on Mar. 4, 2009.

BACKGROUND OF THE INVENTION

1. Field of the Invention

The present invention relates generally to a file management system that provides user interface for systematically managing a plurality of files and a computer program product.

2. Description of the Related Art

With proliferation of information technology devices, such as personal computers (PCs), digital cameras, and cellular phones, documents and images are increasingly handled in computerized format (hereinafter, a computerized document, image, or the like is referred to as a "file"). Each of these files is typically managed by an information technology device such that a user can retrieve and operate a desired file by operating the information technology device.

For instance, a technique of managing files in a tree structure, in which folders are nested, is employed in Windows (registered trademark) that is widely used as an operating system (OS) running on a PC or the like. Retrieval of a desired file is generally performed by walking through the tree structure in a top-down manner or in a bottom-up manner.

Conventionally, various techniques of displaying thumbnail images and/or icon images as visual representation of files and/or folders so that files can be managed intuitively have been proposed. For instance, Japanese Patent Application No. 2006-26829 discloses a technique directed to a user interface, with which icon images representing a plurality of folders at a higher level in hierarchy are laterally arranged in a higher-level display portion of a screen and thumbnail images representing a plurality of files that are at a lower level in the hierarchy and belong to a folder at a specific position are arranged in a lower-level display portion in an arrangement having a substantially-V-shaped lateral side geometry such that a thumbnail image at a specific position corresponding to the corner of the substantially V-shape is displayed in a relatively large size so that a user can have conceptual understanding of scrolling of the thumbnail images in response to operation performed by the user.

However, with this user-interface display apparatus, because a file management element, in units of which file management is to be performed, is a tree-structured folder, file management is performed with reference to the depth direction of the structure. Therefore, the greater the depth of the level of a folder in the hierarchy, the more complicated the operation to reach the folder becomes, which is disadvantageous.

In a tree structure, a position (level) of a folder corresponding to a specific node and that of another folder corresponding to another node differ from each other, which makes it difficult to intuitively make sense of the relationship between the folders.

To this end, the applicant has proposed a technique related to a file management apparatus that displays a plurality of symbol images, each of which represents a file management element, on a display unit in a matrix arrangement and displays, when one of the displayed symbol images is selected, a thumbnail image associated with the symbol image and registered on the display unit, thereby causing a user to make sense of relationship between the file management elements and performing file management efficiently (Japanese Patent Application No. 2008-124060).

FIG. 23 is a schematic diagram illustrating an example of a file management screen that displays a file managed by the file management apparatus, which is disclosed in Japanese Patent Application No. 2008-124060 mentioned above, and that is displayed on a display apparatus of a client computer connected to the file management apparatus via a network.

As illustrated in FIG. 23, on the display apparatus, areas P (places), in each of which files are to be registered, are displayed in a matrix and layer name areas L1 vertically arranged adjacent to the areas P and for use in management of places on the same row are displayed (place map screen). Such a matrix of places arranged in multiple layers on the place map screen is hereinafter referred to as a "place matrix."

One of the layer name areas L1, the one being on the middle row, is named "favorite" while the other layer name areas L1 are displayed as "new layer" because their names are not determined yet. A place attribute, a place name, and the like, which are indices entered by a user for characterization of each place, of the area P at the middle of the middle-row layer are registered. The registered place name of this area is "My Place."

Each of the other areas P, of which place attribute, place name, and the like are not registered yet, is displayed as "New Place!".

Data pertaining to a file managed by the file management apparatus can be registered only when the data is associated with an area P whose place attribute and place name are registered. More specifically, in the example depicted in FIG. 23, registration of a file is allowed only by causing the file to be associated with the area P whose place name is "My Place" among the areas P arranged in a matrix.

To register a file in a desired place in the place matrix, it is necessary for a client computer to launch special-purpose software that can handle location information about areas of the matrix and to perform login process and the like.

Meanwhile, there are some cases where a user desires to perform only file uploading under a circumstance where viewing a place map screen is unnecessary.

This does not arise a problem when the special-purpose software is run already and continuously; however, in a case where running the special-purpose software can interfere with a work performed by the user, such as a case where the user is performing an operation by using another application software on the client computer, it has been necessary to perform preparatory operation, such as launch of the special-purpose software, every time when uploading a file.

SUMMARY OF THE INVENTION

It is an object of the present invention to at least partially solve the problems in the conventional technology.

According to an aspect of the present invention, there is provided a file management system that includes a plurality of client terminals; and a file management apparatus that is connected to the plurality of client terminals via a network. At least one of the client terminals includes a display control unit that displays, on a display screen of a display unit, a display area related to computer program that provides a transmission function; a file-information acquiring unit configured to acquire, when a displayed graphical object that represents a file is grabbed by a pointer of an operating device and dragged to and dropped on the displayed area, the file represented by the displayed graphical object and file managing information that is associated with the file; and a transmitting unit that transmits the file and the file managing information acquired by the file-information acquiring unit to the file management apparatus. The file management apparatus includes a storage unit that stores therein the file and the file management information, transmitted from the client terminal, and location information to be used for causing a symbol image of the file management information to be displayed in a matrix arrangement on the display unit; and a display control unit that displays the symbol image in a matrix arrangement on the display unit based on the location information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating a folder structure for managing setting information and the like;

FIG. 4 is a diagram of an example of placeMap.xml;

FIG. 19 is a schematic diagram illustrating an overview of an uploading process;

FIGS. 20A to 20F are illustrations of an example animation flow that teaches how a display area changes from start of drag-and-drop operation to end of uploading;

DETAILED DESCRIPTION OF THE PREFERRED EMBODIMENTS

Exemplary embodiments of the present invention are described below with reference to the accompanying drawings.

(Overall Configuration of File Management System)

Figure 1:
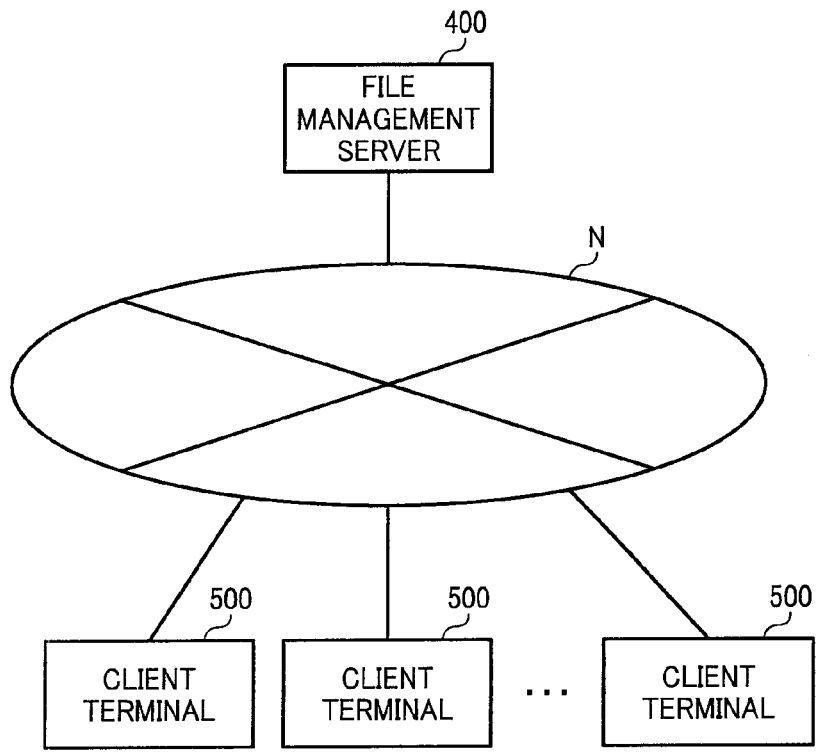
FIG. 1 is a schematic diagram illustrating the configuration of a file management system according to an embodiment of the present invention.

FIG. 1 is a schematic diagram illustrating the configuration of a file management system according to an embodiment of the present invention.

As illustrated in FIG. 1, the file management system includes a plurality of client terminals 500, such as a PC, a multi function peripheral (MFP), and the like, a file management server 400, which is an embodiment of the file management apparatus that manages files and folders uploaded from the client terminal 500, and a network N that connects the client terminals 500 and the file management server 400 in a communicable manner.

Figure 23:
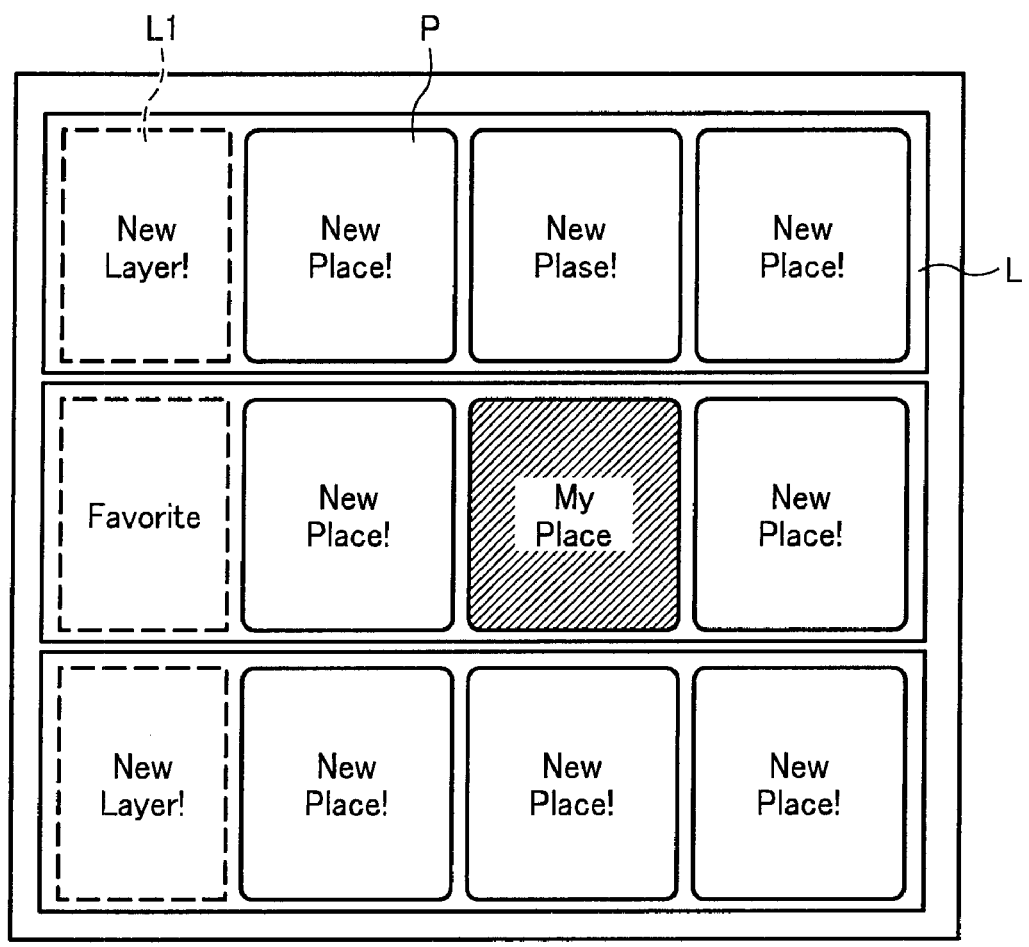
FIG. 23 is a schematic diagram illustrating an example of a file management screen that displays a file being managed by a file management apparatus and that is displayed on a display apparatus of a client computer connected therewith via a network.

As in the case of the conventional file management apparatus discussed above, the file management server 400 is capable of managing files uploaded by client terminals by utilizing places arranged in a matrix as depicted in FIG. 23. In the present embodiment, as will be described later, examples of the client terminal 500 include a terminal that has a function of displaying a place map screen illustrated in FIG. 23 and a terminal that does not have the function of displaying the place map screen but has a function of performing uploading by a drag-and-drop operation.

(Description about File Management Server)

Figure 2:
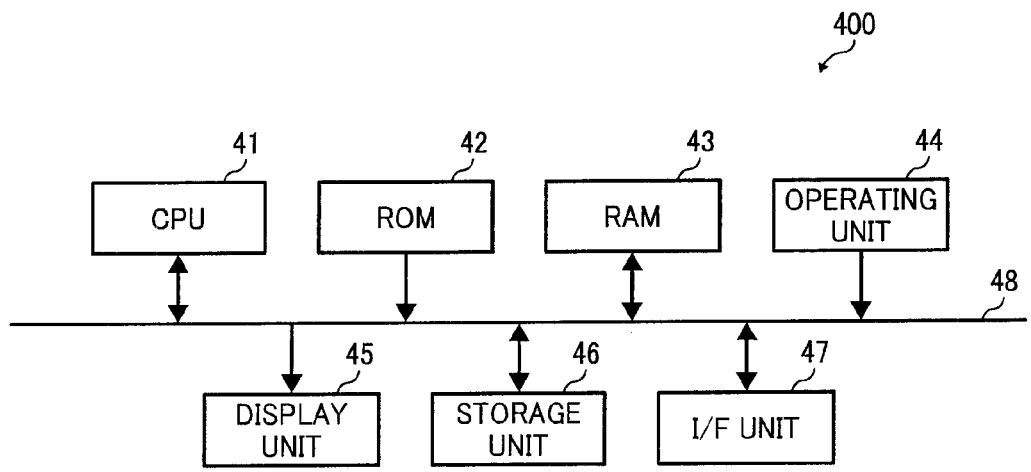
FIG. 2 is a schematic diagram illustrating a hardware configuration of a file management server.

FIG. 2 is a hardware configuration diagram of the file management server 400 illustrated in FIG. 1.

As illustrated in FIG. 2, the file management server 400 includes a central processing unit (CPU) 41 that controls the entire apparatus by executing computer programs to implement various function units (see FIG. 5), which will be described later, a read only memory (ROM) 42 that stores therein computer programs and various data, a random access memory (RAM) 43, into which the CPU 41 loads computer programs, an operating unit 44 that includes an input device such as a mouse and/or a keyboard, a display unit 45 that includes a display device such as a liquid display monitor for use in displaying the place map screen illustrated in FIG. 23, a storage unit 46 that serves as a first storage unit and implemented in a storage device, such as a hard disk drive (HDD), that stores therein various computer programs and data, an interface (I/F) unit 47 that serves as a transmitting unit that transmits thumbnail images, which will be described later, comment data, and the like to a client terminal, and a bus 48, via which the units are connected to each other.

The storage unit 46 manages a file transmitted from a user (the client terminals 500) as well as associates the transmitted file with setting information, such as file management information (a placeID folder to be described later) (see FIG. 3) that indicates a file structure element, in units of which file management is to be performed, and stores therein the setting information and the transmitted file in a predetermined folder structure.

The management structure of the setting information, such as the file management information (the placeID folder to be described later) (see FIG. 3), to be stored in the storage unit 46 illustrated in FIG. 2 will be described below.

Figure 3:
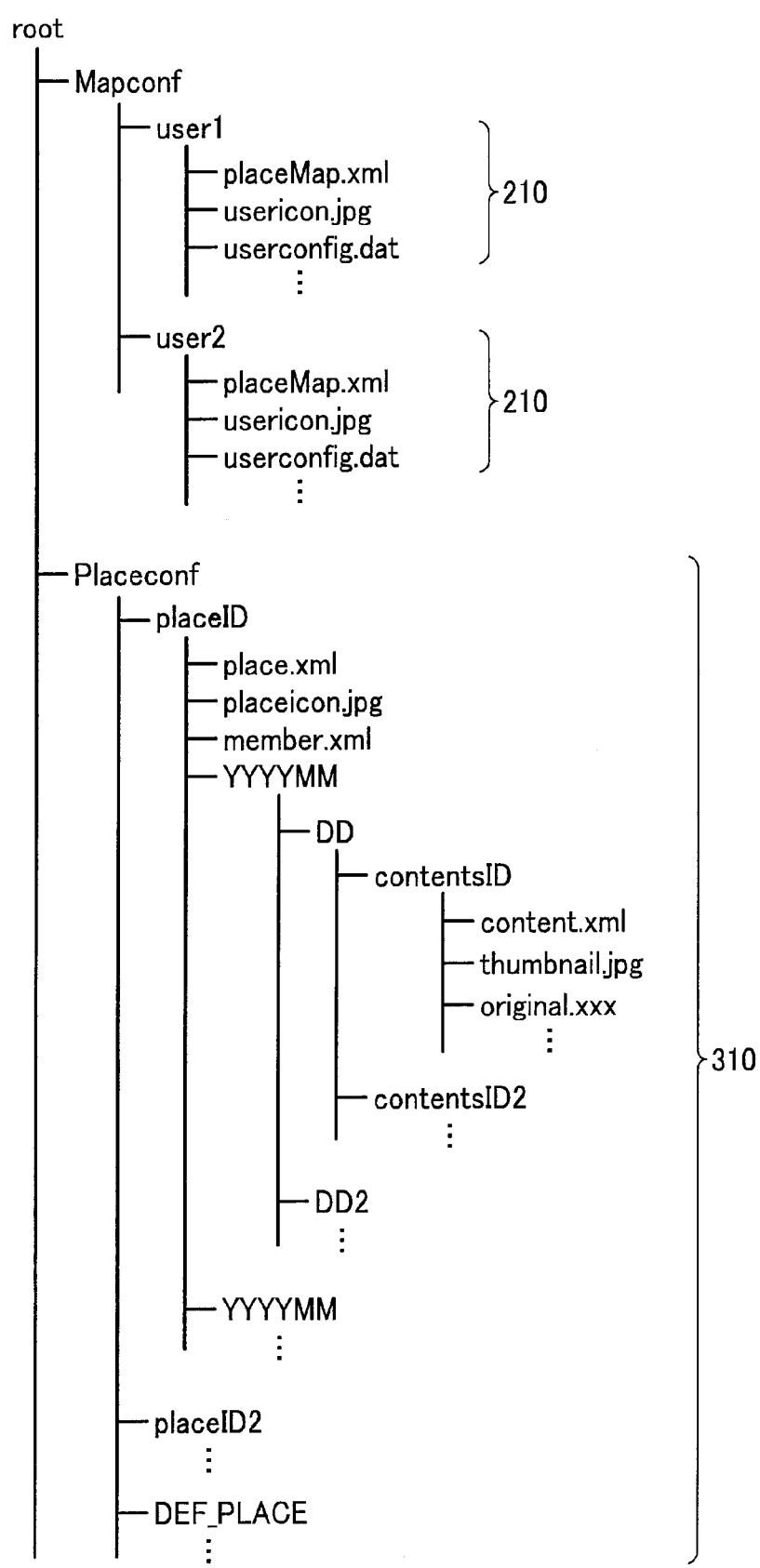

FIG. 3 is a diagram illustrating a folder structure for managing the setting information and the like stored in the storage unit 46.

As illustrated in FIG. 3, the storage unit 46 has a tree-structured folder structure for holding the setting information and the like. This folder structure is generally formed with a map managing unit 210 that stores therein setting information for use in displaying the place map screen illustrated in FIG. 23 and a place managing unit 310 that stores therein setting information about the areas P (places) illustrated in FIG. 23.

(Place Map)

The map managing unit 210 includes a Mapconf folder that is a root folder of the map managing unit 210. The Mapconf folder includes user folders (user1, user2, and the like) that are provided on an individual user (user ID) of the system basis.

In the user folder, setting information (place map information: placeMap.xml) about the place map screen illustrated in FIG. 23 for a user ID corresponding to user folder name is stored. In addition, the user folder contains "userConfig.dat," in which information related to the user, such as an icon image (usericon.jpg) for the user ID, and name and contact address (e.g., E-mail address) of a user, to whom the user ID is assigned, is to be recorded.

FIG. 4 is a schematic diagram illustrating an example of placeMap.xml, which is setting information about the place map screen illustrated in FIG. 23.

As illustrated in FIG. 4, placeMap.xml is described in an XML format (see the first line).

In a tag on the second line, the date (updateTime) when this placeMap.xml was updated, and a place name (preCurrentID) of an area P (place) illustrated in FIG. 23 where immediately preceding operation was performed are described.

In placeMap.xml, a plurality of layer settings 201 defined as tags <layer name="X", tag="Y"> and </layer> are described. In the tags, each of "X" and "Y" stands for a null or an arbitrary character string.

Specifically, to display the place map screen illustrated in FIG. 23 on a predetermined display unit, a display control unit causes the place map screen to be displayed on the display unit such that layers (areas L), which are independently configured according to a corresponding one of the layer settings 201, are arranged from a top portion of the screen in an order in which the layer settings 201 are described (contained) in the place map information (placeMap.xml). Put another way, the order of the layer settings 201 described in the place map information is in direct correspondence with positions (displayed positions) of the layers arranged on the screen.

When a layer name is registered in the layer settings 201, or, more specifically, when an arbitrary character string is set to "X" of "layer name="X"," this character string is displayed in the layer name area L1 on a corresponding layer illustrated in FIG. 23.

For instance, "Favorite" is registered as a layer name in the second layer settings 201 illustrated in FIG. 4. In this case, as illustrated in FIG. 23, "Favorite" is displayed in the layer name area L1 corresponding to the layer settings 201.

When "X" is null, or, more specifically, for a layer of which layer name is not registered yet, a character string (e.g., "New Layer!" illustrated in FIG. 23) indicating that the layer name is not registered yet can be displayed; alternatively, a null character can be displayed (the layer is to be displayed without name).

A configuration in which the layer itself is not displayed can be employed; however, for a layer of which layer name is registered, the registered layer name is preferably displayed in the layer name area L1.

As illustrated in FIG. 4, each of the layer settings 201 contains a plurality of place settings 202 defined as tags <place ID="Z">. In the tags, "Z" stands for a null or an arbitrary character string.

Each set of the place settings 202 corresponds to one of the areas P (places) illustrated in FIG. 23. A place corresponding to one set of the place settings 202 is displayed as being associated with a layer configured according to one set of the layer settings 201, to which the set of the place settings 202 belongs.

The place map screen illustrated in FIG. 23 is displayed such that place images (placeicon.jpg) (see FIG. 3), which are symbol images that independently correspond to the place settings 202, are displayed from a left portion to a right portion of a layer in an order, in which the place settings 202 are described in the layer settings 201. Put another way, the order of the place settings 202 described in the layer setting 201 provides location information for displaying the place images in a matrix on the place map screen.

When a layer name is registered in the place settings 202, or, more specifically, when an arbitrary character string is set to "Z" of "place ID="Z"," a display control unit 512 displays this character string in a corresponding place.

For instance, "My Place" is registered as a place name of a second-from-the-top place in the second (second-from-the-top) layer settings 201 illustrated in FIG. 4. In this case, as illustrated in FIG. 23, "My Place" is displayed in the center place of the layer on the second row corresponding to the layer settings 201 and the place setting 202 on the place map screen.

When "Z" is null, or, specifically, for a place of which place name is not registered yet, a character string (e.g., "New Place!" illustrated in FIG. 23) indicating that the place name is not registered can be displayed; alternatively, a null character can be displayed (the place is to be displayed without name).

When the place setting 202 is registered as being associated with an icon image (placeicon.jpg) (see FIG. 3), which will be described later, this icon image is displayed in a corresponding place.

In "Y" of "tag="Y"" of the layer setting 201, a layer attribute, which is an index that characterizes each of the layers (the layer settings 201) and that is input from the client terminal 500 illustrated in FIG. 1 is registered. As the layer attribute, an arbitrary character string, such as "Favorite" and "Photos" can be registered as in the case of the second layer settings 201 illustrated in FIG. 4, for example.

The thus-registered layer attribute of the layer is inherited by places displayed on the layer, thereby forming a major category that is common to the places.

It is assumed that the place map information contains, in its initial state, a plurality of (e.g., three) layer settings 201 in which layer names and layer attributes are not registered yet.

It is also assumed that the same quantity, which is two or more, (e.g., three) of the place settings 202, in which place names and place attributes are not registered yet, are registered in each of the layer settings 201.

With reference to FIG. 3, the structure of the folders stored in the storage unit 46 will be further described below.

The place managing unit 310 illustrated in FIG. 3 stores therein various setting information about the places mentioned above. More specifically, a Placeconf folder is the root folder of the place managing unit 310. This Placeconf folder holds placeID folders (placeID, placeID2, ...) corresponding to file management information and a DEF_PLACE folder that holds setting information about a place of which attribute and place name are not registered yet, or in other words, in an unregistered state.

The placeID folders independently correspond to the place settings 202 described in the place map information (placeMap.xml) of the map managing unit 210 so as to allow access to a corresponding placeID folder based on a set of the place settings 202. Specifically, at a time when a place name is registered, a placeID folder having a folder name identical to the place name is created, whereby each set of the place settings 202 is associated with a corresponding one of placeID folders. For any one set of the place settings 202 in which place name is not registered yet, the DEF_PLACE folder is referred to.

The placeID folder holds file registration information about a place (hereinafter, "associated place") associated with the placeID folder.

In place.xml (place information), information about an associated place of a placeID folder that contains the place.xml is registered. Examples of the information include the indexes, such as a place attribute discussed above and description entered by a user (the client terminal 500) for characterization of each place.

In the place attribute, an arbitrary character string, such as a word and/or a symbol, can be registered.

The place attribute can be registered independent of the layer attribute discussed above. In contrast to the layer attribute that forms a major category common to the places, the place attribute forms a minor category provided for each of the places. Accordingly, the place map screen illustrated in FIG. 23 allows, by utilizing the layers and the places (areas P), systematic management of files in units of major categories that are further classified into minor categories.

On the place map screen illustrated in FIG. 23, placeicon.jpg is an icon image (symbol image) displayed in a place associated with a placeID folder, in which placeicon.jpg is held. Note that a format of an image to be held as an icon image is not limited thereto. Data for a default image can be provided in advance so that the default image can be displayed in a case where an icon image is not registered by a user.

(YYYYMM Folder)

A YYYYMM folder is a folder that indicates the year-and-month of file registration in the associated place and created by a setting changing unit 413 illustrated in FIG. 5, which will be described later, on a monthly basis for the month of the file registration. The "YYYY" designates the year AD and the "MM" designates the month.

The YYYYMM folder holds a DD folder that indicates the date of file registration in the associated place and that is created by the setting changing unit 413 for each date of the file registration.

Accordingly, the year, month, and date of file registration in the place can be obtained by referring to data in the YYYYMM folder and the DD folder.

(ContentsID Folder)

The DD folder holds one or more contentsID folders, each of which is associated with a corresponding one of files registered in the place. The contentsID folder is given the same name as a name of the file (not including extension portion) registered in this place. Another naming method can be employed; for example, folder names can be serial numbers.

The contentsID folder holds content.xml, in which information about a file corresponding to the contentsID folder is described, thumbnail.jpg, which is a thumbnail image representing the file, original.jpg, which is original data of the file, and the like. More specifically, information, such as storage location where the file corresponding to the contentsID folder is actually stored and a file attribute, which will be described later, registered in the file, is described in content.xml (the file information).

Other examples of the original data of the file than original.jpg include original.png, which is image data, and original.doc, which is document data.

The DEF_PLACE folder has a similar structure with that of the placeID folder discussed above and holds setting information about an unregistered place.

In the DEF_PLACE folder, the place information is held in its initial state where attribute is not described and a YYYYMM folder and following folders are not contained.

(Place Managing Unit)

The place managing unit 310 holds member.xml (member list), in which a user ID of a user of this placeID folder (i.e., place) is recorded on an individual placeID folder basis. The user can be an owner and a share member of the placeID folder.

When a plurality of user IDs are recorded in the member list, the place is shared by the user IDs recorded in the member list. Hereinafter, such a place in a shared state is referred to as a shared place.

Identifying information for indication of an owner is added to a user ID of a user who has created the place associated with the placeID folder that holds the member list among the user IDs recorded in the member list. Access permission, which will be described later, is given to a user ID of a user who is a share member of this place.

As described above, the storage unit 46 manages data, such as the layer settings 201 and the place settings 202, based on which the map managing unit 210 displays a place map on a user-by-user basis, as well as manages data pertaining to a place, such as file data to be registered for the place, based on which the place managing unit 310 displays each place on the place map. Accordingly, it is allowed to display the place map illustrated in FIG. 23 by using the data via the storage unit 46.

(Functional Block Diagram of File Management Server 400)

Figure 5:
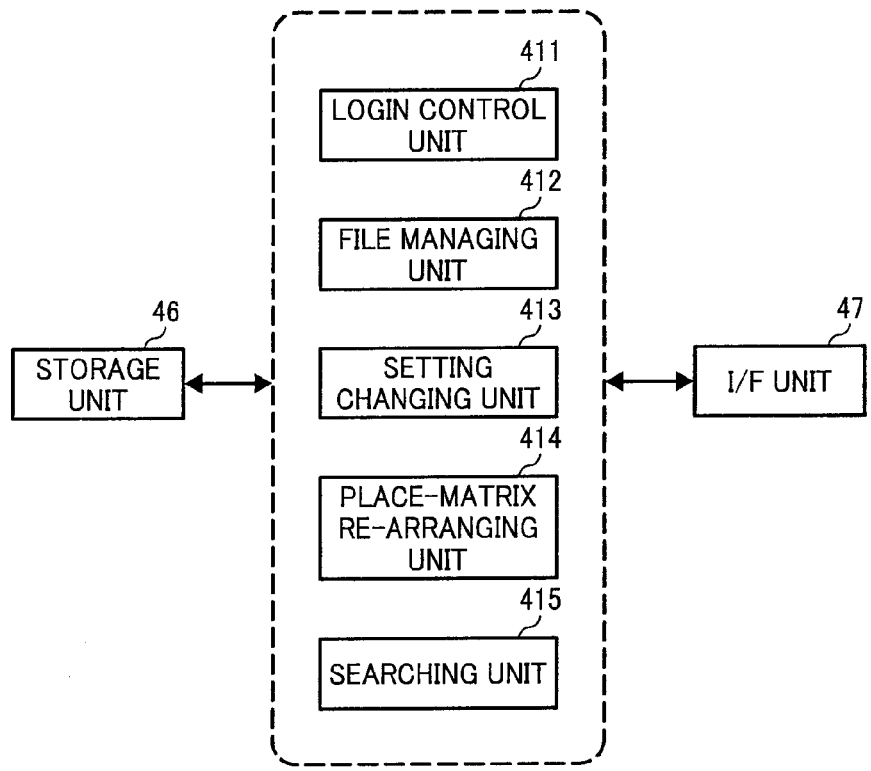
FIG. 5 is a functional block diagram of a file management server.

FIG. 5 is a functional block diagram of the file management server 400.

As illustrated in FIG. 5, the file management server 400 includes a login control unit 411 that is an authentication unit that performs login authentication of the client terminal 500 (user) illustrated in FIG. 1, a file managing unit 412 that is a file managing unit that manages files stored in the storage unit 46 illustrated in FIG. 2 on an individual user basis, the setting changing unit 413 that changes setting information in the storage unit 46 according to an instruction from the client terminal 500 via the I/F unit 47 or the like, a place-matrix re-arranging unit 414 that rearranges, when the setting changing unit 413 has made setting change for a place matrix, or, specifically, for instance, when the setting changing unit 413 has changed definition in place.xml illustrated in FIG. 4, the place matrix according to the setting change, and a searching unit 415 that searches the storage unit 46 for a file in response to an instruction fed from the client terminal 500 via the I/F unit 47 or the like. These units are implemented by cooperation of the CPU 41 and various computer programs stored in the ROM 42 or the storage unit 46.

The functional units of the file management server 400 illustrated in FIG. 5 will be described in detail below.

<Login Control Unit>

The login control unit 411 receives a login request, which will be described later, from the client terminal 500 and verifies a set of a user ID and a password contained in the login request against reference data stored in the storage unit 46 in advance to determine whether the user is an authenticated user.

It is assumed that a set of a user ID and a password of a user registered as an authenticated user has been recorded in advance in the reference data.

<File Managing Unit>

The file managing unit 412 extracts the setting information illustrated in FIG. 3, files, and the like pertaining to the user authenticated by the login control unit 411 for use in displaying user interface on a display unit 55 of the client terminal 500 from the storage unit 46 and transmits the setting information and the like to the client terminal 500 via which the user has logged in.

The file managing unit 412 reads, from the storage unit 46, place map information (placeMap.xml) of the map managing unit 210 illustrated in FIG. 3 and a placeID folder in the place managing unit 310 associated with the user ID having been permitted of login by the login control unit 411, and transmits the place map information and the placeID folder to the client terminal 500.

Specifically, the file managing unit 412 locates a user folder ("user1," "user2," or the like) (see FIG. 3) corresponding to the user ID permitted of login, then reads out the place map information (placeMap.xml) in this user folder from the map managing unit 210 and reads a placeID folder that corresponds to the placeID (see FIG. 4) described in this place map information and that contains the user ID in its member list (member.xml) (see FIG. 3) from the place managing unit 310.

In a case where a user folder ("user1," "user2," or the like) (see FIG. 3) corresponding to the user ID permitted of login is not provided in the map managing unit 210, or, put another way, a user is logging in by a new user ID, the file managing unit 412 creates a user folder, of which folder name is the user ID, in the map managing unit 210, and further creates the map managing unit 210 and the place managing unit 310 in this user folder.

It is assumed that place map information for the thus-created new map managing unit 210 is configured such that a place is a new place of which initial state is, for instance, a place matrix with three rows by three columns.

When the setting information is updated by the setting changing unit 413 and the place-matrix re-arranging unit 414, the file managing unit 412 transmits the updated setting information to the client terminal 500 to thereby update setting information held in the client terminal 500. The setting information can be transmitted such that only changed portion of the setting information is transmitted as data about differences, or alternatively all the setting information about the currently-logging-in user ID is transmitted.

Upon receiving a request for viewing a file that belongs to a specific place from one of the client terminals 500 as will be described later, the file managing unit 412 reads out a thumbnail (thumnail.jpg) (see FIG. 3) that represents this file from the storage unit 46, and transmits the thumbnail image to the client terminal 500 that has issued the viewing request.

<Setting Changing Unit>

Upon receiving a request for changing setting related to a place map screen, such as a request for registering (uploading) or deleting a file, setting change of a layer name and/or a place name, and moving or deleting a place from one of the client terminals 500, the setting changing unit 413 updates setting information in the storage unit 46 according to contents of this request.

<Place-matrix Re-arranging Unit>

The place-matrix re-arranging unit 414 changes the number of layers and/or the number of places included in the place matrix on the place map screen according to settings described in the place map information having been changed by the setting changing unit 413 to thereby rearrange the place matrix.

<Searching Unit>

Upon receiving a request for a search by using a search key, such as attribute information (tag) appended to each of the layers, places, and files or a specific character string (hereinafter, "keyword") from one of the client terminals 500, the searching unit 415 searches for a file that contains the search key.

The searching unit 415 retrieves the file that contains the search key from the storage unit 46, identifies a contentsID folder corresponding to the thus-retrieved file in the place managing unit 310 illustrated in FIG. 3, and copies a tree structure of a DD folder and a YYYYMM folder, to which this contentsID folder belongs, together with various data in the contentsID folder, to another storage area, such as the RAM 43 or the storage unit 46 illustrated in FIG. 2.

The searching unit 415 merges the thus-copied contentsID folders to create a placeID folder that holds the thus-found files under the date indicated by the YYYYMM folder and the DD folder, and transmits this placeID folder to the client terminal 500 as a response to, or as a result of, the search request.

Meanwhile, in place information (place.xml) contained in the placeID folder, folder names of the contentsID folders that are associated with contents of place information about placeID folders that hold original folders (the contentsID folders being the copy source) of the contentsID folders are described.

(Description about Client Terminal)

The client terminal 500 illustrated in FIG. 1 will be described below.

Figure 6:
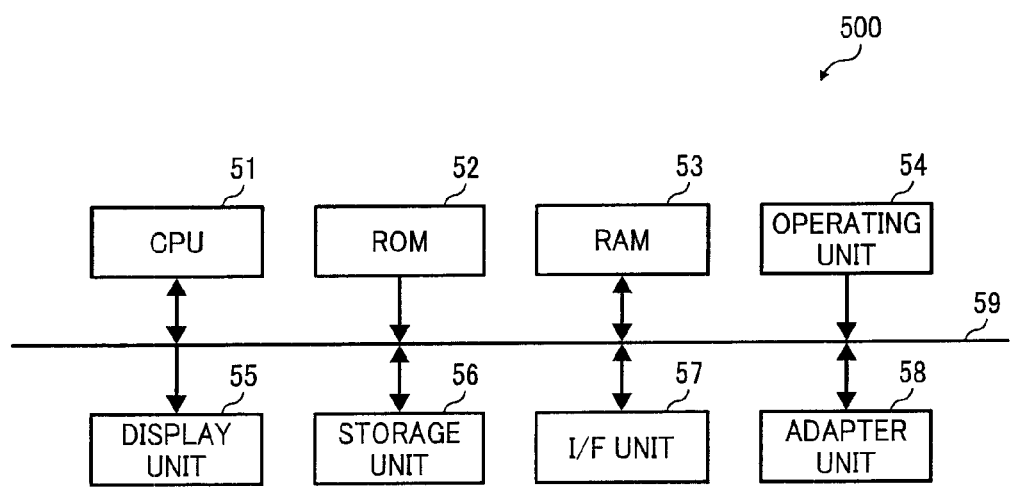
FIG. 6 is a schematic diagram illustrating a hardware configuration of a client terminal.

FIG. 6 is a schematic diagram illustrating the hardware configuration of the client terminal 500.

As illustrated in FIG. 6, the client terminal 500 includes a CPU 51 that controls the entire apparatus by executing computer programs to implement various function units (see FIGS. 7A and 7B), which will be described later, a ROM 52 that stores therein computer programs and various data, a RAM 53, into which the CPU 51 loads computer programs, an operating unit 54 that includes an input devices such as a mouse or a keyboard, the display unit 55 that includes a display device such as a liquid display monitor, a storage unit 56, which is a storage device such as an HDD, that stores therein various computer programs and data, an I/F unit 57 that controls communication with an external device, an adapter unit 58 on which an auxiliary storage device, such as a memory card, is detachably mounted, and a bus 59, via which the units are to be connected to each other.

Figure 7A:
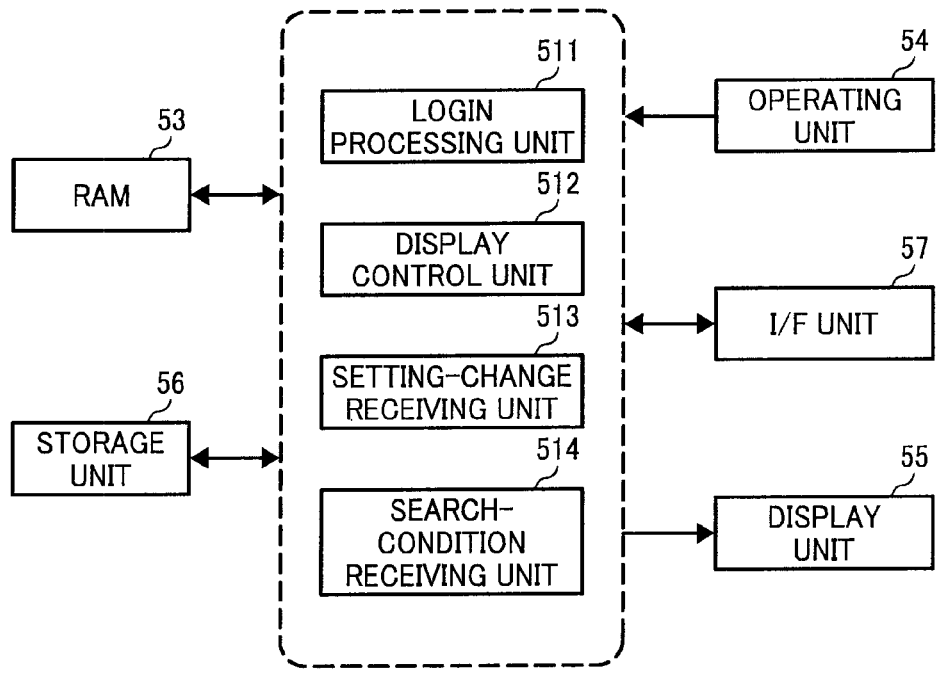
FIGS. 7A and 7B are functional block diagrams of the client terminal.
Figure 7B:
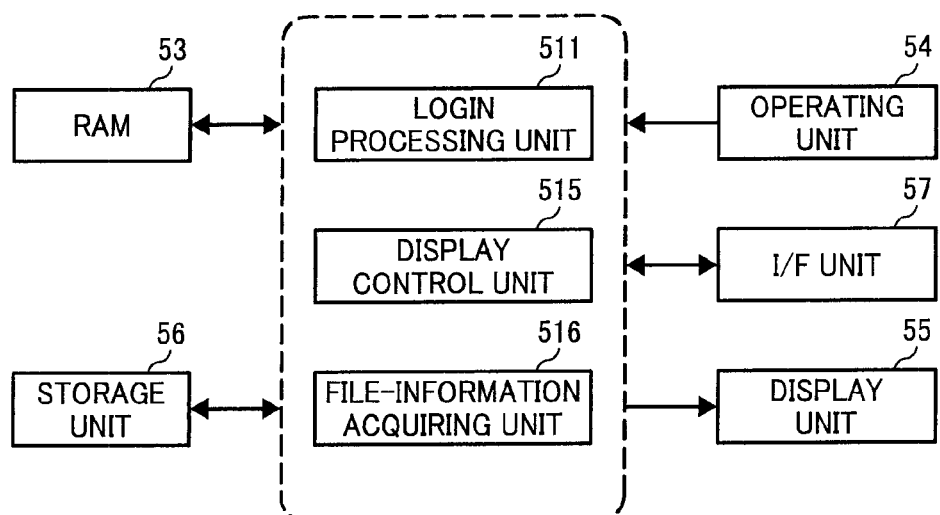

FIGS. 7A and 7B are functional block diagrams of the client terminal 500. FIG. 7A depicts a terminal (hereinafter, "first client terminal 500-1") that includes a unit that displays the place map screen. FIG. 7B depicts a terminal (hereinafter, "second client terminal 500-2") that does not include a unit that displays the place map screen but is capable of uploading in response to a drag-and-drop operation. Note that an operation that is common to the first client terminal 500-1 and the second client terminal 500-2 will be described as an operation of the client terminal 500 without differentiation between the terminals in the following description.

<First Client Terminal>

The client terminal 500-1 will be described below. The client terminal 500-1 includes a login processing unit 511 for use in logging-in to the file management server 400, a display control unit 512 that displays a list of thumbnails or the like representing files based on various data fed from the file management server 400, a setting-change receiving unit 513 that is a transmitting unit that receives setting change (request for creating a place ID and the like) on the place map screen or the like entered by a user and transmits the setting change to the file management server 400, and a search-condition receiving unit 514 that receives a search key or the like entered by way of the operating unit 54.

<<Login Processing Unit>>

The login processing unit 511 displays a login dialog box for use in logging-in to the file management server 400 on the display unit 55, and when a user ID and a password are entered in the login dialog box by a user, transmits a login request that includes these pieces of information to the file management server 400.

<<Display Control Unit>>

The display control unit 512 of the client terminal 500-1 displays, on the display unit 55, a list of thumbnail images or the like representing files that belong to the associated place based on various data (the placeID folders illustrated in FIG. 3 and the like) fed from the file management server 400 via the I/F unit 57.

More specifically, upon receiving setting information that is transmitted from the file management server 400 when logging in or setting change is performed, the display control unit 512 holds this setting information in the RAM 53 or the storage unit 56 in the tree structure illustrated in FIG. 3. Upon receiving an operation related to screen display by way of the operating unit 54 from a user, the display control unit 512 displays, on the display unit 55, a thumbnail representing the file based on the setting information held in the RAM 53 or the storage unit 56.

The display control unit 512 of the first client terminal 500-1 is not allowed to handle, among the various data fed from the file management server 400, the place map information (placeMap.xml) and hence unable to display the place map.

<<Setting-change Receiving Unit>>

The setting-change receiving unit 513 receives an operation related to setting change on the place ID (place information) illustrated in FIG. 3 or the like and transmits a setting-change request for taking the setting change into effect to the file management server 400, thereby requesting the file management server 400 to perform the setting change.

Meanwhile, examples of the operation related to setting change on the place map screen or the like include registration, change, and deletion of a place name; the setting-change receiving unit 513 is not allowed to receive an operation of changing a positional relationship on a matrix, such as moving a place on the place map screen or registering a place name by specifying a place position.

Upon receiving one of these operations by way of the operating unit 54, the setting-change receiving unit 513 transmits, as a change request, information including at least description about the operation and a user ID of the currently-logging-in user to the file management server 400.

<Second Client Terminal>

The second client terminal 500-2 will be described below.

The second client terminal 500-2 includes the login processing unit 511 for use in logging-in to the file management server 400, a display control unit 515 that displays, on a display screen of a display unit, a display area related to computer program that provides a transmission function, and a file-information acquiring unit 516 that acquires, when a displayed graphical object related to a file is grabbed, dragged to, and then dropped on the displayed area with a pointer of an operating device, the file represented by the displayed graphical object and file managing information. Upon receiving a notification that the file-information acquiring unit 516 has acquired the file information, the I/F unit 57 performs a process for making connection to the file management server 400.

(Login Process)

Figure 8:
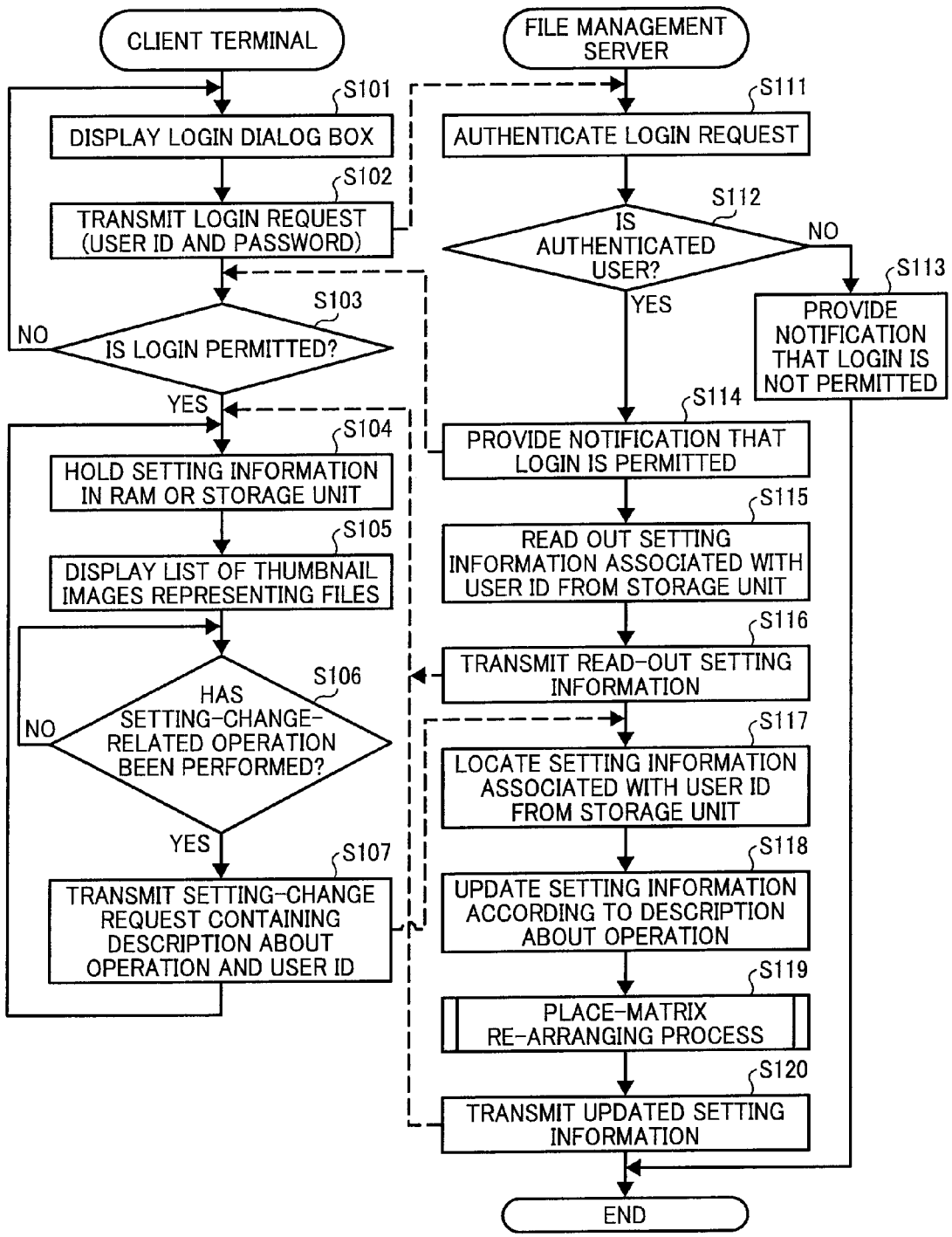
FIG. 8 is a flowchart for illustrating a procedure of a login process to be performed by the file management server and the client terminal.

FIG. 8 is a flowchart for illustrating a procedure of a login process to be performed by the file management server 400 and the client terminal 500. Meanwhile, it is assumed that a user ID and a password of a user that operates the client terminal 500 have been registered in the file management server 400 in advance.

The login processing unit 511 of the client terminal 500 transmits a login request that includes at least the user ID and the password having been set by the user in advance to the file management server 400 (Step S102).

In the file management server 400, upon receiving the login request from the client terminal 500, the login control unit 411 checks the set of the user ID and the password contained in the login request against reference data stored in the storage unit 46 to determine whether the user is an authenticated user (Step S111).

When it is determined that the set of the user ID and the password contained in the login request do not coincide with the reference data through the authentication performed at Step S111, or, in other words, the user is determined as an unauthenticated user (No at Step S112), the login control unit 411 transmits response information indicating that login is not permitted to the client terminal 500, from which the login request has been transmitted (Step S113), after which the process ends.

When it is determined that the set of the user ID and the password contained in the login request coincides with the reference data, or, in other words, the user is determined as an authenticated user (Yes at Step S112), the login control unit 411 transmits response information indicating that login is permitted to the client terminal 500, from which the login request has been transmitted (Step S114), and system control proceeds to Step S115.

In the client terminal 500, the login processing unit 511 acquires the response information from the file management server 400 and determines whether the response information indicates that login is permitted (Step S103).

If the response information indicates that login is not permitted (No at Step S103), the display control unit 512 displays an error message.

If the response information indicates that login is permitted (Yes at Step S103), system control proceeds to file uploading to be performed by the login processing unit 511.

Meanwhile, with the client terminal 500-2, connection to the file management server 400 is made to start login process when a drag-and-drop operation for uploading a file, which will be described later, is performed by a user.

(Displaying Place View Screen)

Figure 9:
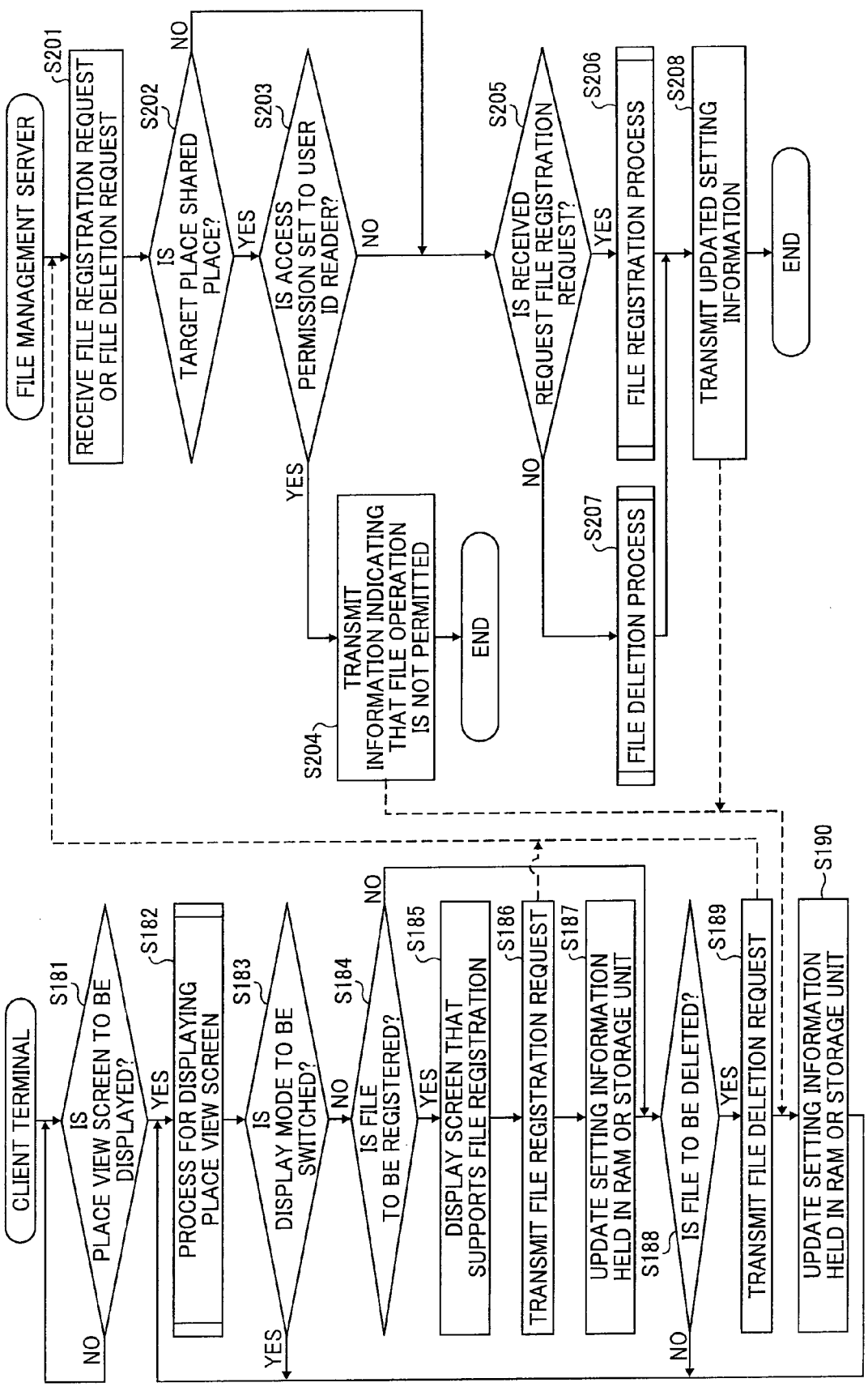
FIG. 9 is a flowchart illustrating a procedure of a process for displaying a place view screen performed by the file management server and the client terminal.

How the place view screen is displayed will be described below. FIG. 9 is a flowchart illustrating a procedure of a process for displaying the place view screen performed by the file management server 400 and the first client terminal 500-1. It is assumed that the display unit 55 of the client terminal 500 is currently displaying a place view screen.

The display control unit 512 waits for issuance of an instruction for displaying a place view screen of a specific place among places displayed on the place map screen (No at Step S181). When it is determined that the instruction for displaying the place view screen has been issued (Yes at Step S181), the display control unit 512 refers to a "placeID" folder of the place to be displayed in the place managing unit 310 according to the setting information held in the RAM 53 or the storage unit 56, and performs the process for displaying the place view screen (Step S182).

Figure 10:
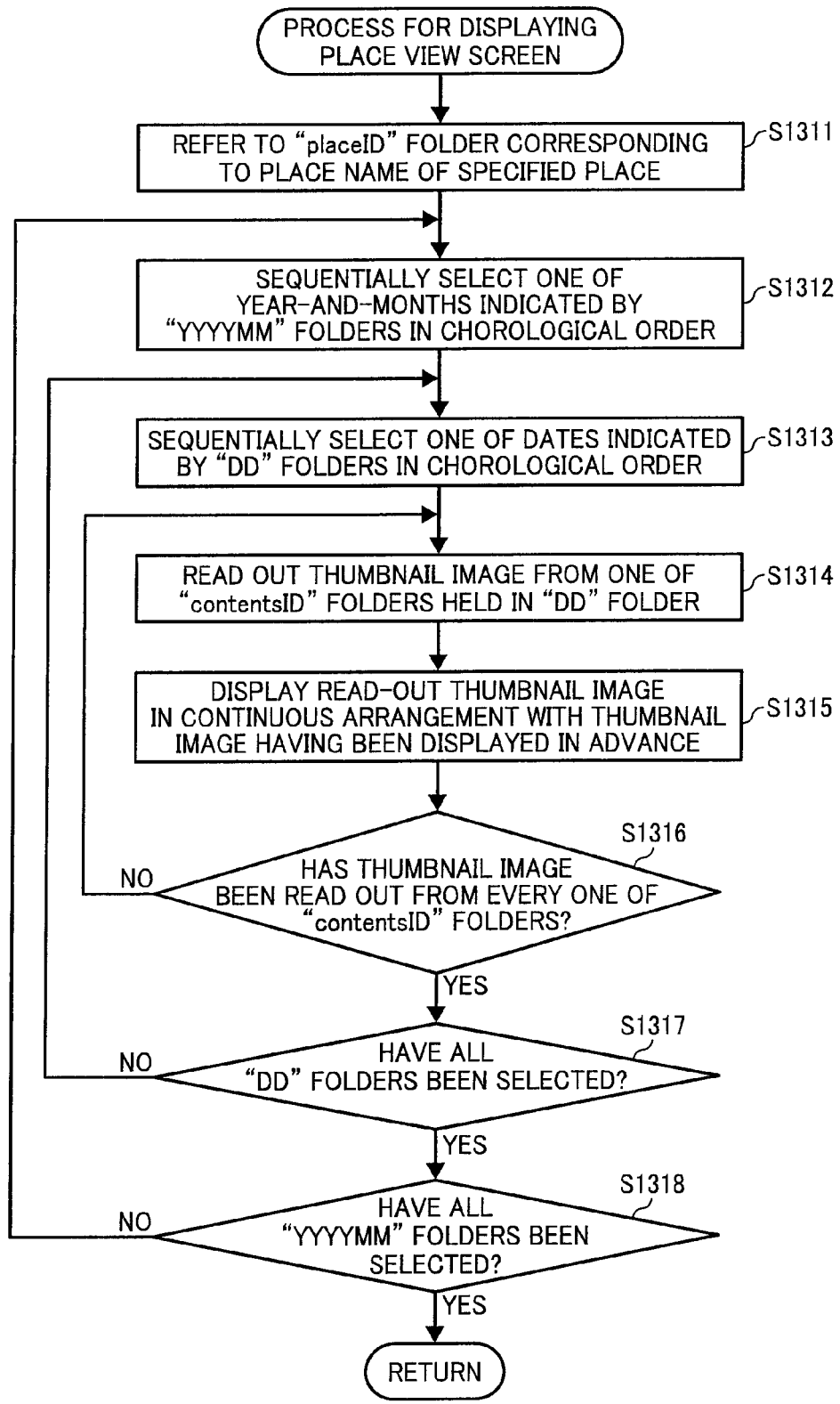
FIG. 10 is a flowchart illustrating a procedure of a process for displaying the place view screen.

FIG. 10 is a flowchart illustrating a procedure of the process for displaying the place view screen. The display control unit 512 refers to a "placeID" folder corresponding to a place name of the thus-specified place (Step S1311).

The display control unit 512 sequentially selects one of year-and-months indicated by "YYYYMM" folders held in the "placeID" folder in chorological order (Step S1312). The display control unit 512 then sequentially selects one of dates indicated by "DD" folders held in the "YYYYMM" folder selected at Step S1312 in chorological order (Step S1313).

The display control unit 512 reads out a thumbnail image from one of "contentsID" folders held in the "DD" folder selected at Step S1313 (Step S1314), and displays the thumbnail image read out at Step S1314 in a continuous arrangement with a thumbnail image having been displayed on the place view screen in advance (Step S1315). In a case where display is performed for the first time and a thumbnail image is not displayed yet, the thus-read-out thumbnail image can be displayed at a predetermined position on the place view screen.

Subsequently, the display control unit 512 determines whether a thumbnail image has been read out from every one of the "contentsID" folders held in the "DD" folder selected at Step S1313 (Step S1316). If it is determined that there is at least one "contentsID" folder, from which a thumbnail image is not read out yet (No at Step S1316), system control returns to Step S1314 again to read out a thumbnail image from the "contentsID" folder, from which a thumbnail image is not read out yet.

If it is determined at Step S1316 that a thumbnail image has been read out from every one of the "contentsID" folders (Yes at Step S1316), the display control unit 512 determines whether all the "DD" folders held in the "YYYYMM" folder selected at Step S1312 have been selected (Step S1317). If it is determined that there is at least one "DD" folder that is not selected yet (No at Step S1317), system control returns to Step S1313 to select the "DD" folder that is not selected yet.

If it is determined at Step S1317 that all the "contentsID" folders have been selected (Yes at Step S1317), the display control unit 512 determines whether all the "YYYYMM" folders held in the "placeID" folder referred to at Step S1312 have been selected (Step S1318). If it is determined that there is at least one "YYYYMM" folder that is not selected yet (No at Step S1318), system control returns to Step S1312 again to select the "YYYYMM" folder that is not selected yet. If, at Step S1318, it is determined that all the "YYYYMM" folders have been selected (Yes at Step S1318), system control proceeds to Step S183 illustrated in FIG. 9.

At step S182, the display control unit 512 displays the place view screen. Display modes of the place view screen will be described in detail below.

Figure 11:
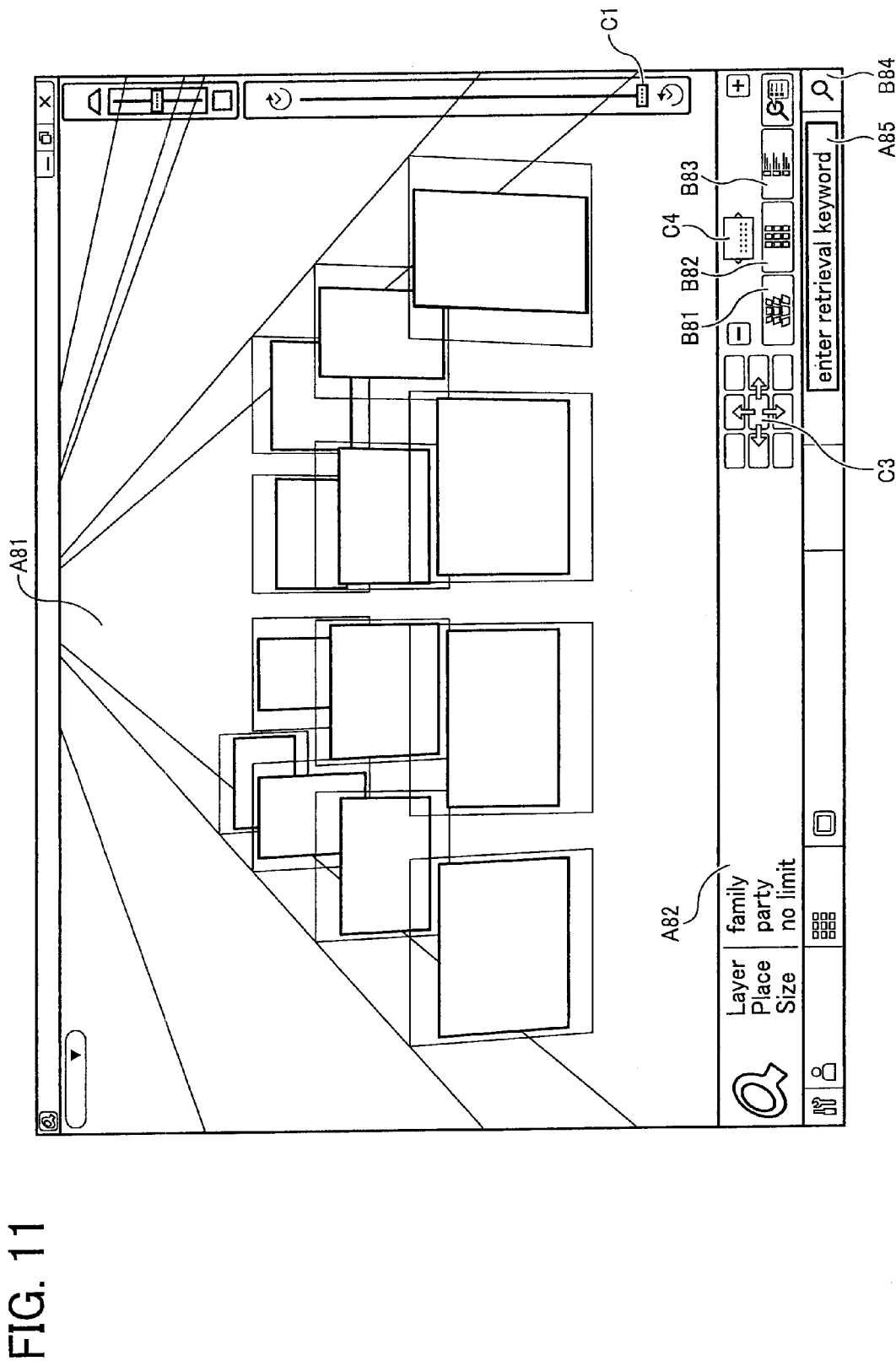
FIG. 11 is a diagram illustrating an example of the place view screen.

FIG. 11 is a diagram illustrating an example of the place view screen.

An area A81 in this example is an area where thumbnail images representing files registered in a place selected as a to-be-displayed place are to be displayed. In the display mode illustrated in FIG. 11, the thumbnail images representing the files registered in the to-be-displayed place are arranged in a three-dimensional manner (3D) in the area A81 as a projection image, in which the files are arranged according to file registration date.

A cursor C1 is a cursor button for use in changing arrangement order of the thumbnail images displayed in the area A81. When the cursor C1 is moved up or down, the display control unit 512 changes the arrangement order of the thumbnail images displayed in the area A81 such that thumbnail images are moved to the back side (up) or to the front side (down) of the screen so that some of the thumbnail images representing relatively new files or some of the thumbnail images representing relatively old files are displayed on the front.

A cursor C3 is a cursor button (place-switching button) for use in changing a to-be-displayed place on the place view screen. When the cursor C3 is moved to the left or to the right on the place view screen, the display control unit 512 changes a place specified as a to-be-displayed place to a place on the left side or on the right side of the place currently specified as the to-be-displayed place according to positions of the places on the place map screen. Similarly, when the cursor C3 is moved up or down on the place view screen, the display control unit 512 changes a place specified as the to-be-displayed place to a place above or below the place currently specified as the to-be-displayed place according to the positions of the places on the place map screen. The display control unit 512 then performs the process for displaying the place view screen based on the thus-selected new to-be-displayed place.

Upon receiving a signal indicating that the cursor C3 is moved in any one of upward, downward, leftward, and rightward directions while the place view screen is displayed, the display control unit 512 performs switching from the place view screen with respect to the currently-displayed place to a place view screen with respect to a place located away from the currently-displayed place in the direction in which the cursor C3 has been moved. This allows thumbnail images that represent files contained in the places to be displayed pursuant to an operation performed by a user based on the positions of the places. Accordingly, the user can make sense of a relationship between file management elements intuitively and hence manage files efficiently. In the above example, it is assumed that the cursor C3 is operable in four directions, which are upward, downward, leftward, and rightward direction; however, the cursor C3 can be configured to be operable in eight direction including oblique directions, such as an upward-to-the-right direction and a downward-to-the-left direction.

With reference to FIG. 11, the cursor C4 is a cursor button for use in changing magnification of the place view screen displayed in the area A81. When the cursor C4 is moved to the left (the side designated by "−") on the screen, the display control unit 512 decreases the displayed size of a group of the thumbnail images displayed in the area A81 depending on the distance by which the cursor C4 is moved. When the cursor C4 is moved to the right (the side designated by "+") on the screen, the display control unit 512 increases the displayed size of a group of the thumbnail images displayed in the area A81 depending on the distance by which the cursor C4 is moved.

In an area A82, a layer name of a layer, to which the to-be-displayed place belongs, a place name of the to-be-displayed place, total size of files registered in the to-be-displayed place, and the like are displayed. These pieces of information are displayed by the display control unit 512 based on a folder name of the folder that holds the thumbnail images displayed in the area A81, and "content.xml" and place map information held in the folder, and the like.

Buttons B81 to B83 are buttons for use in switching a display mode of the place view screen. By selectively clicking one of the buttons B81 to B83, a user who operates the client terminal 500 is allowed to switch the display mode of the place view screen.

The button B81 is a button for receiving an instruction for displaying a group of thumbnail images in a three-dimensional manner. Upon receiving a signal indicating that the button B81 is clicked, the display control unit 512 displays a group of thumbnail images on a place view screen in such a three-dimensional display mode as illustrated in FIG. 11. In the example illustrated in FIG. 11, it is assumed that source files represented by the thumbnail images are image files; however, in a case where a source file is a document file, such as a document, contents of the document can be displayed as a thumbnail image.

The button B82 is a button for use in selecting a display mode of displaying thumbnail images in a two-dimensional array. Upon receiving a signal indicating that the button B82 is clicked, the display control unit 512 displays, in the area A81, thumbnail images that represent files registered in a to-be-displayed place in a two-dimensional array.

The button B83 is a button for use in selecting a display mode of displaying thumbnail images in a list form. Upon receiving a signal indicating that the button B83 is clicked, the display control unit 512 displays a list of thumbnail images in the area A81.

An area A85 is an area for receiving an input of a search key that serves as a keyword in file search. The button B84 is a button for specifying a search by using the search key input in the area A85. When this button B84 is clicked, the search-condition receiving unit 514 is notified of the search key entered in the area A85.

At Step S183 illustrated in FIG. 9, the display control unit 512 determines whether an instruction for switching the display mode has been issued by clicking of one of the buttons B81 to B83 or the like. When it is determined that an instruction for switching the display mode has been issued (Yes at Step S183), system control returns to Step S182 again, and the display control unit 512 displays the place view screen in a display mode specified by the instruction.

Figure 12:
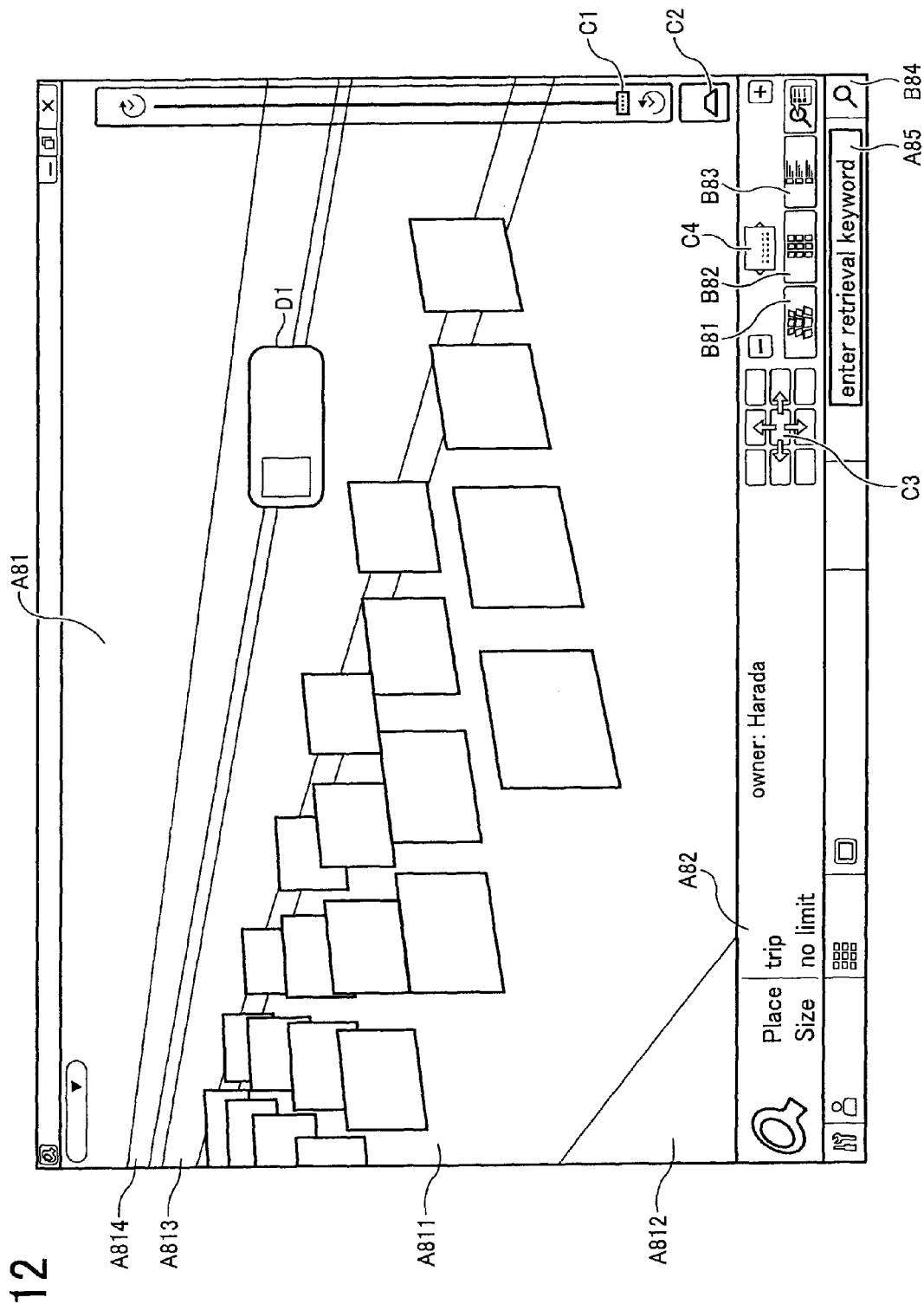
FIG. 12 is a diagram illustrating another example of the place view screen.

FIG. 12 is a diagram illustrating another example of the place view screen. Either one of such a screen as illustrated in FIG. 11 and such a screen as illustrated in FIG. 12 has been specified in advance by a user as a to-be-displayed screen by way of the operating unit 54. In this screen, a background image (in this example, an image of clouds and sky) is displayed across the area A81. Semitransparent lanes A811 to A814 are displayed on this background with thumbnail images displayed in the center lane A811. A cursor C2 for use in changing a display angle of the thumbnail images displayed in the area A81 is provided. When the cursor C2 is moved up or down, the display control unit 512 changes a viewing location for use in displaying (drawing) an array of thumbnail images in the horizontal direction or the vertical direction by an amount that depends on the distance by which the cursor C2 has been moved so that the display angle is changed. FIG. 12 illustrates an image as viewed from a viewing location positioned to the right from that of FIG. 11.

In a case where the thumbnail images displayed in FIG. 12 are associated with a place whose place name is "My Place" given on the place map screen illustrated in FIG. 23, placing a pointer of a mouse on the lane A813, which is on the right of the center lane A811, causes an image D1 that includes a place name of a place on the right of "My Place" and an icon of the place to be displayed. A mouse-click in this state causes the thumbnail images displayed on the center lane A811 to be switched from those of files in the place named "My Place" to those of files in the place on the right of the place named "My Place." Similarly, placing the mouse pointer on the lane A812 on the left of the center lane A811 causes an image that includes a place name of a place on the left of "My Place" and an icon of the place to be displayed.

Figure 13:
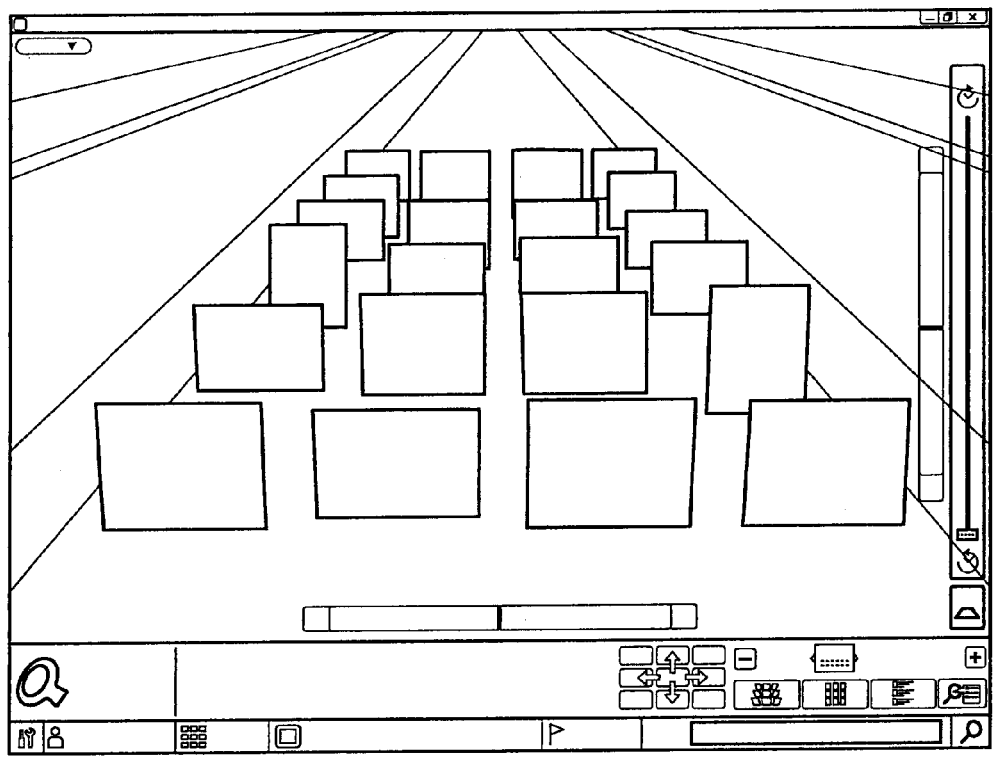
FIG. 13 is a diagram illustrating an example of the place view screen, on which a matrix with 4 rows by 6 columns of thumbnail images is displayed.
Figure 14:
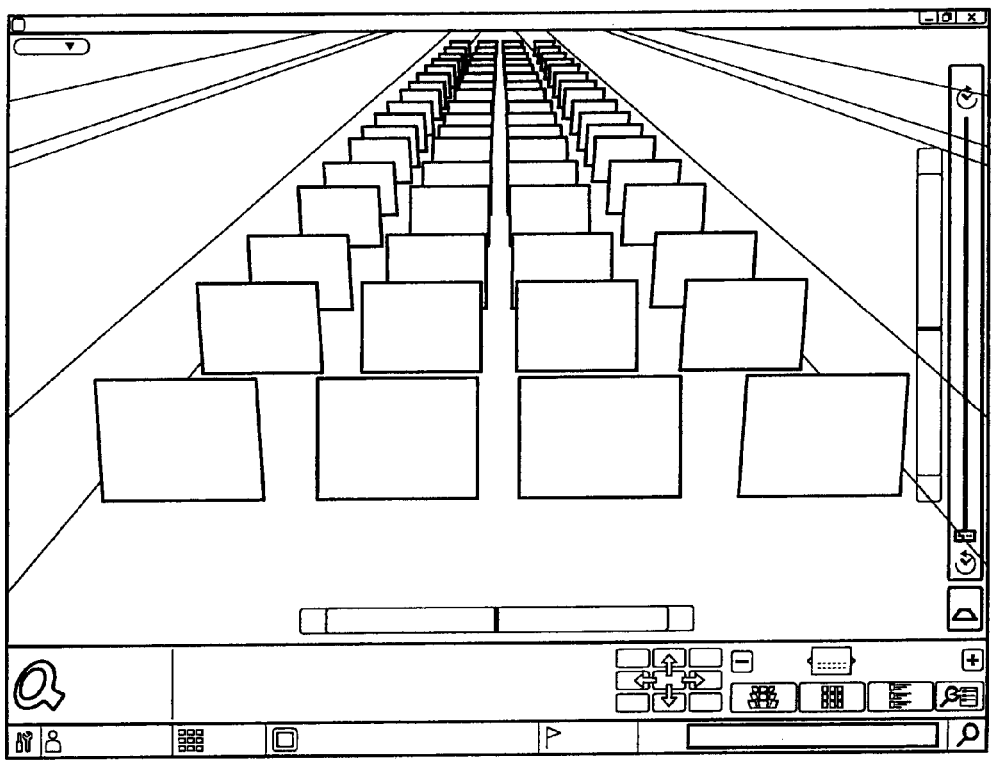
FIG. 14 is a diagram illustrating an example of the place view screen, on which a matrix with 4 rows by 25 columns of thumbnail images is displayed.

FIG. 13 is a diagram illustrating a place view screen that is similar to that of FIG. 12 but differs in that a viewing location for displaying the array of thumbnail images is positioned at a lateral center as in the case of FIG. 11. FIG. 14 is a diagram illustrating a place view screen that is similar to that of FIG. 13 but differs in that the number of thumbnail images is larger in the depth direction. In a conventional apparatus, a fixed arrangement of an array with 4 images in the lateral direction by 6 columns in the depth direction has been employed; in contrast, in the present embodiment, the number of columns in the depth direction can be set to any number from 6 to 25. The deeper an image is located, the smaller the size of the image becomes; however, the size of thumbnail images positioned in the same-numbered row, as counted from the front-end row, in the 6-column display pattern illustrated in FIG. 13 is identical to that in the 25-column display pattern illustrated in FIG. 14. In the place view screens illustrated in FIG. 13 and FIG. 14, zooming in (enlarging displayed size of) or zooming out (reducing displayed size of) an arbitrary one of the thumbnail images can be performed by rotating a scroll button of a mouse with its pointer placed on the thumbnail image.

<Configuring Background Image>

Figure 15:
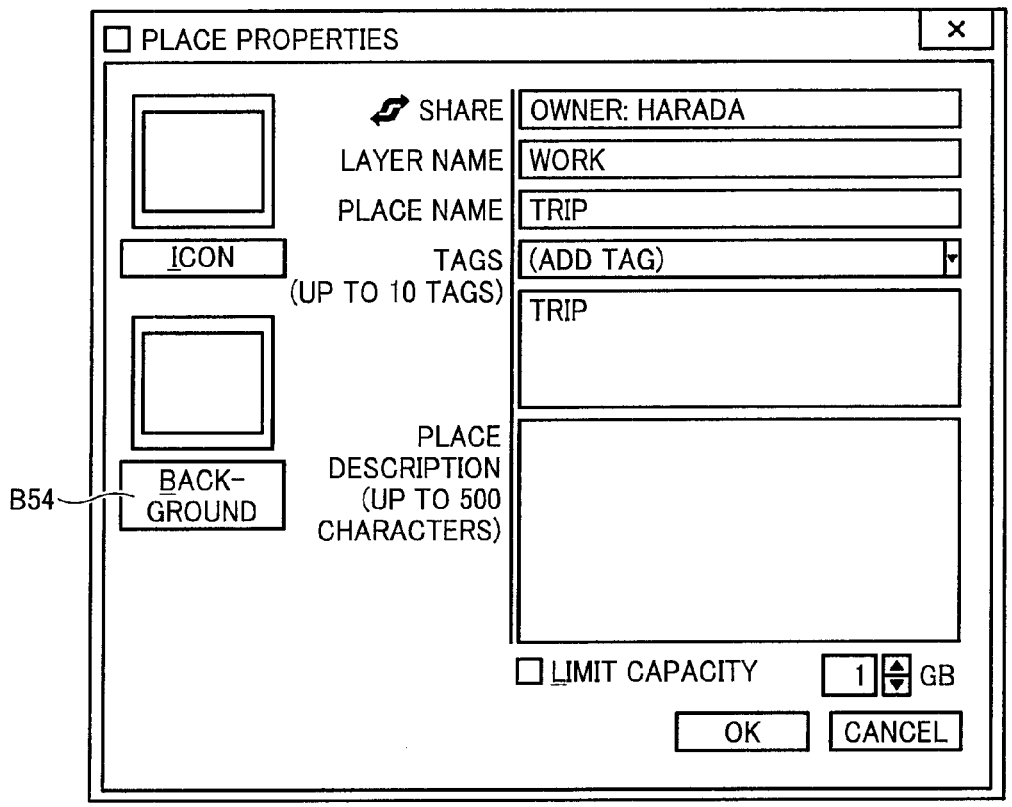
FIG. 15 is a diagram illustrating a place-properties dialog box.
Figure 16:
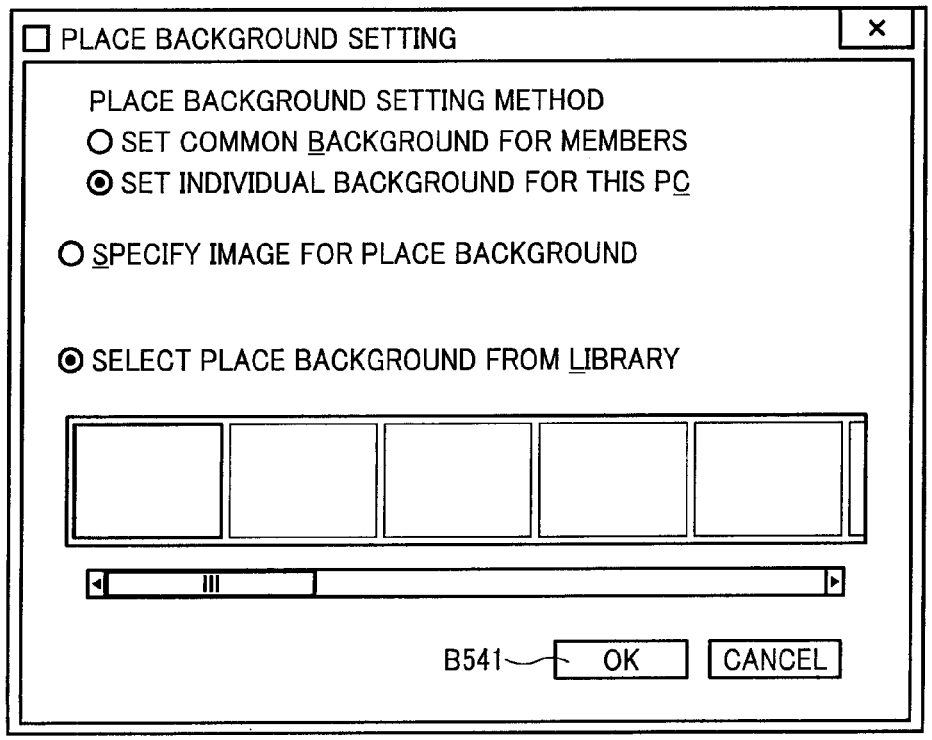
FIG. 16 is a diagram illustrating a place-background setting dialog box.

FIG. 15 is a diagram illustrating a place-properties dialog box. FIG. 16 is a diagram illustrating a place-background setting dialog box that appears when a background setting button B54 is clicked. The dialog box illustrated in FIG. 15 is configured such that the background setting button B54 is additionally provided on a dialog box (not shown) that supports creation of a new shared place. The place-background setting dialog box illustrated in FIG. 16 allows a user to select any one of background images stored in the storage unit 56 and background images provided in advance. There is also provided a "place background setting method" that allows a user to determine, by selecting one of radio buttons, whether to set the thus-selected background image as a common background for share members of a shared place or an individual background image only for this PC (client terminal).

A user operates the operating unit 54 by referring to the setting dialog box illustrated in FIG. 16 to select a background image, performs the "place background setting method," and clicks an OK button B541 to complete the settings. The thus-configured background information is transmitted to the display control unit 512. The display control unit 512 stores the background information in the storage unit 56 on a place-by-place basis. When displaying a place view screen, the display control unit 512 reads out the background information, specifies a background image according to the background information, and causes the display unit 55 to display the background image.

<Setting Number of Rows to be Displayed>

Figure 17:
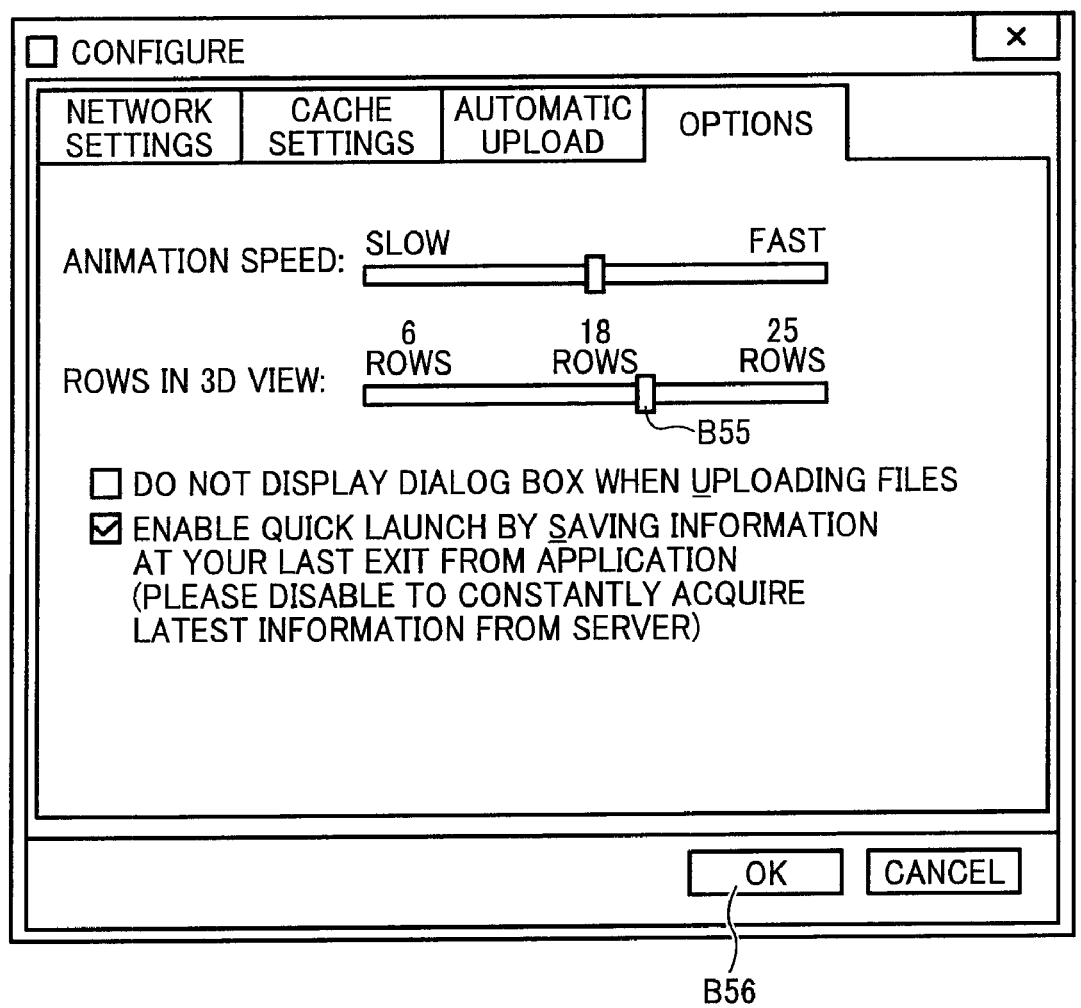
FIG. 17 is a diagram illustrating a dialog box for setting a maximum number of rows to be displayed.

FIG. 17 illustrates a dialog box for setting the number of rows to be displayed. This dialog box appears when an "options" tab is selected. Selection can be made by using a "rows in 3D view" slider button B55 in this dialog box. By clicking an OK button B56 after making the selection, the setting is completed.

(File Registration Process)

Figure 18:
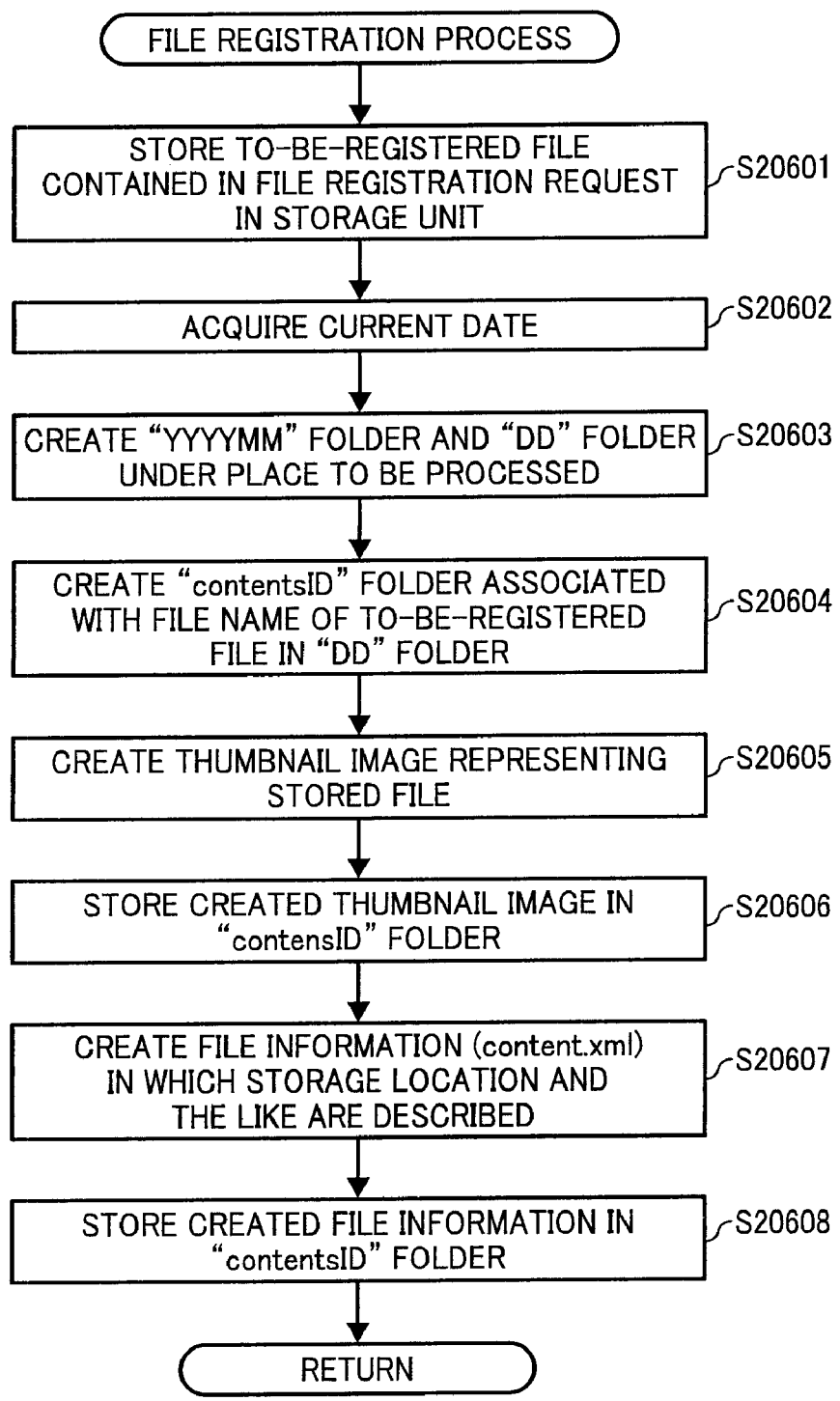
FIG. 18 is a flowchart illustrating a procedure for a file registration process.

The file registration process to be performed by the file management server 400 will be described with reference to FIG. 18.

The setting changing unit 413 stores a to-be-registered file that is contained in the file registration request in a predetermine area of the storage unit 46 (Step S20601). The file can be stored in any area. For example, the file can be stored and managed in a database, or can be stored in an external storage device other than the storage unit 46.

The setting changing unit 413 acquires the current date from a clock unit (not shown) that measures date and time (Step S20602), and creates a "YYYYMM" folder and a "DD" folder that indicate the current date in a predetermined structure under a place to be processed (Step S20603). When the "YYYYMM" folder and the "DD" folder that indicate the current date have already been created, this process is to be skipped.

Subsequently, the setting changing unit 413 creates a "contentsID" folder corresponding to a file name of the to-be-registered file under the "DD" folder created at Step S20603 (Step S20604). The setting changing unit 413 creates a thumbnail image based on the file stored at Step S20601 (Step S20605), and stores the thus-created thumbnail image in the "contentsID" folder created at Step S20604 (Step S20606).

The setting changing unit 413 further creates file information (content.xml) (Step S20607). The file information contains information contained in the file registration information (user ID, information about the file, and the like) and storage location of the file stored at Step S20601. If the file stored at Step S20601 is a document file, the setting changing unit 413 analyzes contexts and vocabulary of the file to create a summary that briefly describes the document file, and stores the summary in the file information. The analysis of the contexts, vocabulary, and the like can be performed by using known technique.

The setting changing unit 413 stores the file information created at Step S20607 in the "contentsID" folder created at Step S20604 (Step S20608). Thereafter, system control proceeds to Step S208 of FIG. 9.

(Uploading Process)

The uploading process performed by the second client terminal 500-2 will be described below.

FIG. 19 is a schematic diagram illustrating an overview of the uploading process. As illustrated in FIG. 19, on the display unit 55 of the client terminal 500-2, a to-be-uploaded folder 1002, a to-be-uploaded file 1003, a display area 1004 related to the computer program (the file information acquiring unit 516) that provides the transmission function, and the like are displayed. When a mouse and the like is operated such that a pointer 1001 is placed on the to-be-uploaded file 1003 and dragged-and-dropped into the display area 1004, the to-be-uploaded file 1003 is uploaded to the file management server 400 via the network N.

FIGS. 20A to 20F are illustrations of an example animation flow that teaches how the display area 1004 changes from a start of the drag-and-drop operation to an end of uploading.

As illustrated in FIG. 20A, an operating device 1000 is operated to place the pointer 1001 on the to-be-uploaded file 1003 and start dragging. As illustrated in FIG. 20B, when the pointer 1001 reaches an area at a predetermined distance from the display area 1004, a concentric-circle pattern 1005 that has its center at the display area 1004 and are colored in gradations of a predetermined color thickened toward the center appears. As illustrated in FIG. 20C, when a drop operation is performed, the diameter of the concentric-circle pattern 1005 becomes small.

As illustrated in FIG. 20D, an image 1006 that indicates progress of the uploading in a numerical value appears. When the uploading is completed, as illustrated in FIG. 20E, an image, in which small objects 1007 are being sucked into the display area 1004, appears. Thereafter, as illustrated in FIG. 20F, the display area 1004 enters a normal state where the display area 1004 alone is displayed.

Figure 21A:
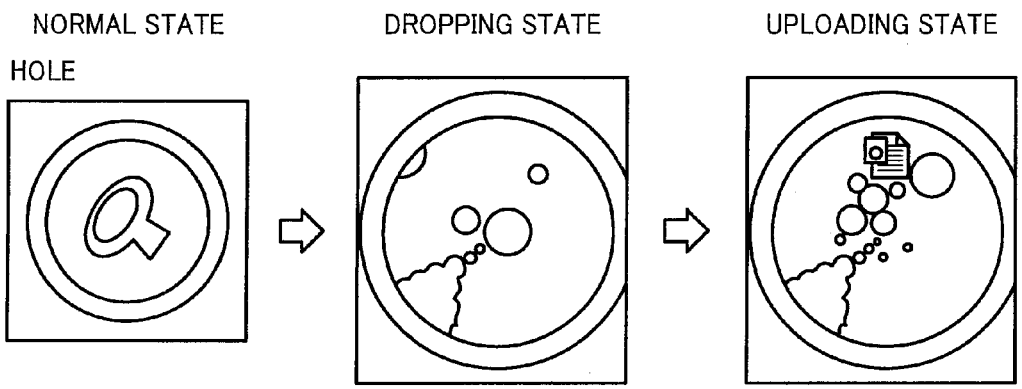
FIGS. 21A to 21C are diagrams illustrating examples of the display area.
Figure 21B:
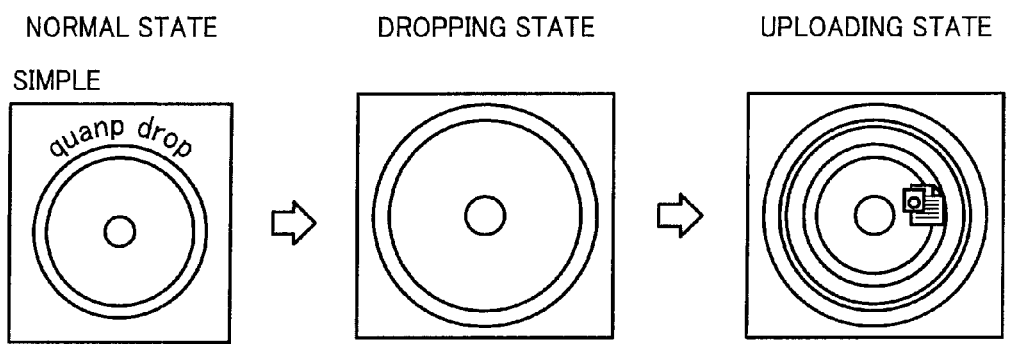
Figure 21C:
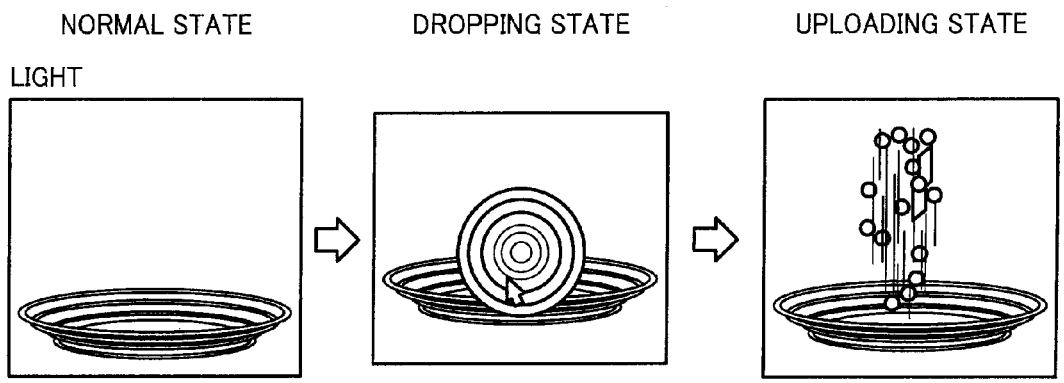

FIGS. 21A to 21C illustrate examples of the display area 1004. These are classified by theme (simple, light, and the like) and managed. FIG. 21A depicts a skin named "Hole," FIG. 21B depicts a skin named "Simple," and FIG. 21C depicts a skin named "Light," in each of which images to be displayed in a normal state, a dropping state, and an uploading state are illustrated from the left to the right. Other alternative designs (skins), from which a choice can be made, include "Ring," "Crown," "Bowl," and the like.

As discussed above, the display control unit 515 performs, in addition to the process of causing a skin serving as a target area of a drag-and-drop operation to be displayed on the display screen, the process of animating the skin depending on progress of the uploading process.

The file-information acquiring unit 516 acquires, when the displayed graphical object 1003 representing a to-be-uploaded file is grabbed by the pointer 1001 of the operating device 1000 and dragged to and dropped on the display area 1004, the file represented by the displayed graphical object and file managing information.

<Acquisition of File and File Management Information>

An image representing the application software (file-information acquiring unit 516) is displayed on the display unit 55 of the second client terminal 500-2. Dragging and dropping a file or a folder to the image causes the application software to acquire the file and file management information (a file name, a file extension, and the date pertaining to the file (hereinafter, "file date")) from the storage unit 56 of the second client terminal 500-2.

The file management information is acquired such that, if the to-be-uploaded file is an image file with Exif data, photographed date of the file contained in the Exif data is acquired as the file date and data about the file date is added to the file management information. If the to-be-uploaded file is other than an image file with Exif data, the date when the file has been updated in the second client terminal 500-2 is added to the file management information as the file date.

Upon receiving an instruction for uploading a plurality of files, the plurality of files are sorted according to the file date and uploaded in a sorted order. The file management apparatus registers the files in the order received at the uploading process and sets registration date to each of the files.

Another configuration of uploading files after sorting the files based on another criterion, such as a file name, or a still another configuration of uploading files without sorting the files can be employed. However, the scheme of sorting files according to file date and uploading the files in the sorted order allows the order according to the file date to become consistent with the order according to file registration date. This brings about an advantage that, on a client terminal having a file viewing function, a place view screen can display a list of thumbnails representing files in an order according to file registration date such that the order is consistent with an order of the files before being uploaded.

<Configuring to-be-uploaded Place>

Figure 22:
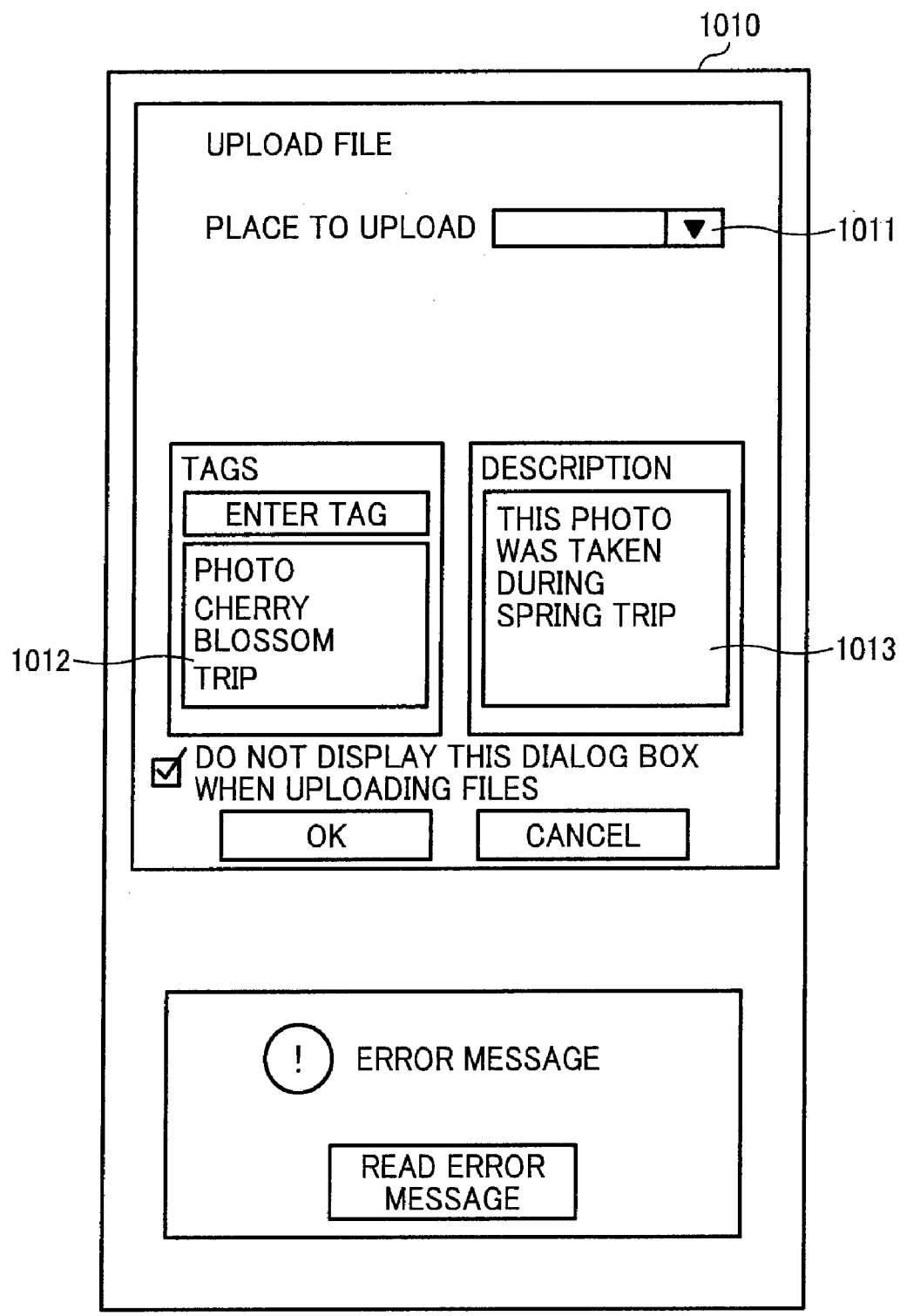
FIG. 22 is a diagram illustrating a file-upload setting dialog box.

The file-information acquiring unit 516 acquires the file and the file management information by performing the above-discussed operation, and further displays a file-upload setting dialog box 1010, an example of which is illustrated in FIG. 22, on the display unit 55.

Selection of a to-be-uploaded place can be made in this dialog box 1010 by using a pull-down menu 1011. It is also allowed to enter a tag (keyword to be associated with a file) in a tag-input display area 1012 and to enter a description about the file in a description-input area 1013. A configuration of specifying a to-be-uploaded place in advance can be alternatively employed.

(Displaying Slideshow)

A process for displaying a slideshow will be described below.

With the file management system, thumbnail images representing original files (original.xxx) (see FIG. 3) in an image file format (e.g., jpg, png, bmp, or gif) among files stored in the storage unit 46 of the file management server 400 can be displayed on the display unit 55 of the client terminal 500 as a slideshow (in which a series of selected images are sequentially displayed) on a place-by-place basis.

FIGS. 24A to 24G a set of diagrams illustrating transition of a slideshow-display processing screen displayed on the display unit 55 of the client terminal 500.

Figure 24A:
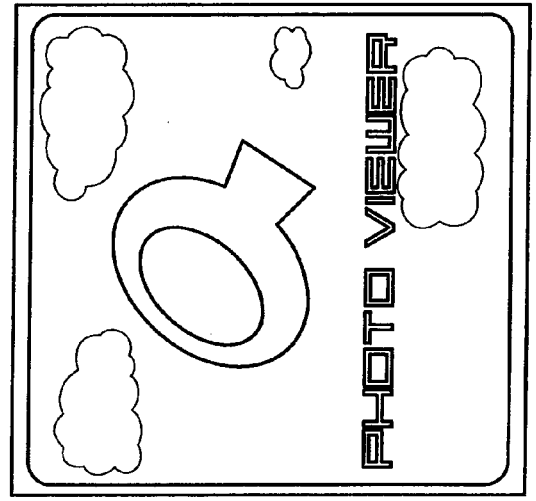
FIGS. 24A to 24G are a set of diagrams illustrating transition of a slideshow-display processing screen to be displayed on the display unit of the client terminal.
Figure 24B:
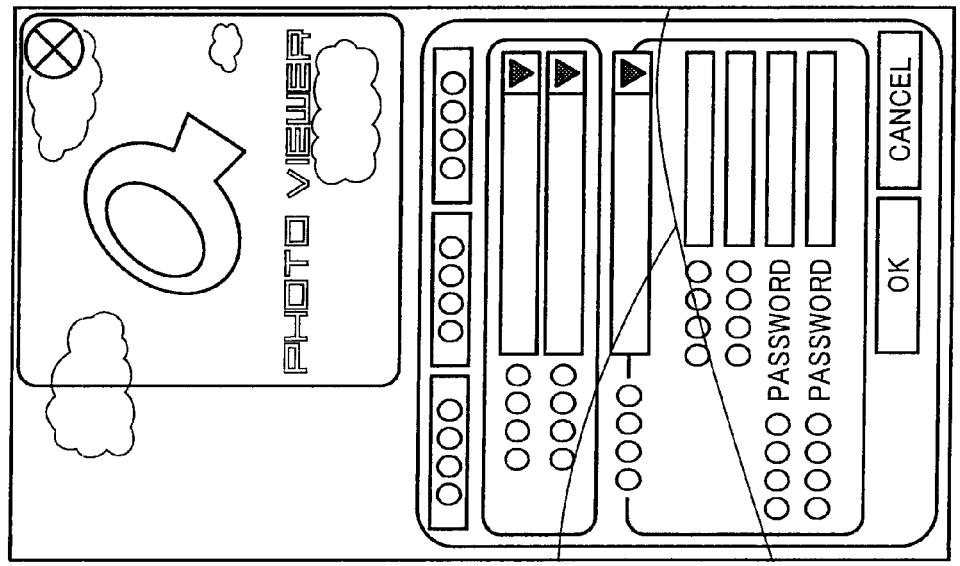
Figure 24C:
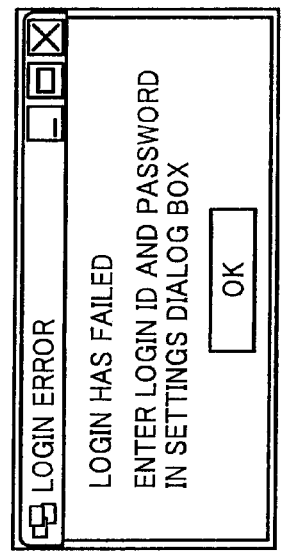

When the client terminal 500 launches software for performing a slideshow displaying process, the display control unit 512 of the client terminal 500 displays a view window (FIG. 24A) for performing the slideshow displaying process, and then displays, if this is initial launch, various settings dialog boxes (FIG. 24B).

In the settings dialog boxes, settings (login settings) for a login ID and a password for accessing files of a user stored in the file management server 400, settings (network settings) for a server and a proxy server, to which the client terminal 500 is to be connected, and settings (slideshow settings) such as a place name of files to be displayed as slideshow and slideshow viewing interval, display order (e.g., ascending or descending order of file names, or random) of files to be displayed as slideshow are configured.

When a login ID and a password are entered in the login settings, the login processing unit 511 of the client terminal 500 limits selectable places to places to which this user is allowed to access, or, in other words, places specified in the member list (member.xml) illustrated in FIG. 3, in which this user ID is defined as an owner or a member.

Meanwhile, in a case where the user ID is deleted from the member list (member.xml), or, in other words, the user ID is no more a member of this place, specifying this place to display files therein as slideshow can be disabled. Alternatively, in such a case, the login control unit 411 of the file management server 400 determines whether the user ID coincides with the user ID recorded in the member list or not, and when it is determined that the user ID does not coincide with the user ID recorded in the member list, an error display (FIG. 24C or the like) can be provided.

Upon completing the network settings, the network settings are held in CommonNetConfig.dat and CommonConfig.xml, which are files created in the storage unit 56 illustrated in FIGS. 7A and 7B in advance.

Upon completing the login settings, the login settings are held in UserConfig.dat, which is a file created in the storage unit 56 in advance.

Upon completing the slideshow settings, slideshow information, such as the place name, is held in SlideshowConfig.xml, which is a file created in the storage unit 56 in advance.

Upon completing the slideshow settings, as will be described later (see FIG. 25), ContentList.xml is created in the storage unit 56 and display order of files in slideshow and the like are stored in ContentList.xml.

Meanwhile, when thumbnail images representing files in a specified place are downloaded, which will be described later, file information, such as file names and updated timestamps of these original images, are also stored in ContentList.xml.

Each of the login settings and the network settings can be changed only when slideshow processing is completed.

If the launch is not initial launch, the display control unit 512 displays the view window illustrated in FIG. 24A and thereafter displays the login dialog box.

A user who attempts to log in enters in this login dialog box a login ID and a password having been set in advance via the operating unit 54 illustrated in FIG. 6.

If the login ID or the password entered by the user fails to coincide with the login ID and the password having been set in advance, the display control unit 512 displays a login error dialog box (FIG. 24C) indicating that authentication has failed and prompts the user to enter a login ID and a password in the settings dialog box again.

If the login ID entered by the user coincides the login ID recorded in the member list and the user ID and the password are determined to be valid, causing the user to be logged in successfully, the display control unit 512 downloads thumbnail images (thumbnail files) representing original files in an image file format (e.g., jpg, png, bmp, or gif) among files stored in the place specified by the user every ten seconds in ascending order of file date, which is the file date in the specified place, and stores the thumbnail images in a cache memory. The cache memory is a second storage unit of the client terminal 500.

Bibliographic information about the thumbnail files are simultaneously downloaded and stored in a bibliographic information file that is to be created in the storage unit 56 or the RAM 53.

The file management server 400 reduces image sizes of the thumbnail files such that longer sides of the thumbnail images attain 200 pixels.

Accordingly, in the client terminal 500, when a thumbnail in a landscape format or a portrait format is displayed on the view window, illustrated in FIG. 24A, of which size is set to 200 pixels in length by 200 pixels in width, the thumbnail is displayed with blank area, or a margin, on at least one of its short sides.

Meanwhile, up to 1,000 thumbnail files can be held in the cache memory, for example.

When a thumbnail file is to be stored in a hard disk drive, such as the storage unit 56 of the client terminal 500, the name of the thumbnail file can be set to "ContentsID_entityTag.extension," for example. In this example, "ContentsID" is a contents ID (numerical value) of the file, "entityTag" is an entity tag of the file, and "extension" is an extension of the file.

Accordingly, when, for instance, "ContentsID," "entityTag," and "extension" of a file are "12345", "eadfwa", and "jpg," respectively, a file name of this file is set to "12345_eadfwa.jpg."

Figure 24D:
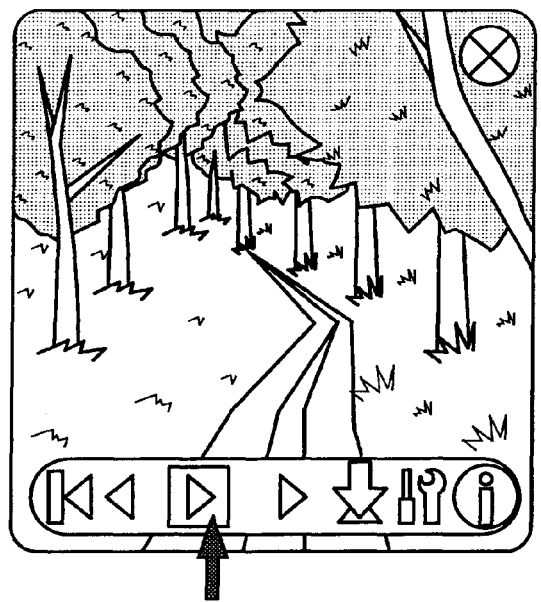

The display control unit 512 displays, in addition to the thumbnails stored in the cache memory, a console window to receive an input of information on the view window (FIG. 24D).

In the console window, a button for displaying a top file, a button for displaying a previous file, a button for stopping/resuming a slideshow, a button for displaying a next file, a button for downloading (DL) an original file, a button for displaying the settings dialog box, and a button for displaying bibliographic information are displayed.

Files are to be displayed as slideshow at the slideshow viewing interval specified in the login settings dialog box illustrated in FIG. 24B and according to a predetermined display order.

By clicking, in the console window, a desired one of the button for displaying a top file, the button for displaying a previous file, the button for stopping/resuming slideshow, and the button for displaying a next file, a user can control a manner in which the files are displayed irrespective of the slideshow viewing interval and the display order.

Figure 24E:
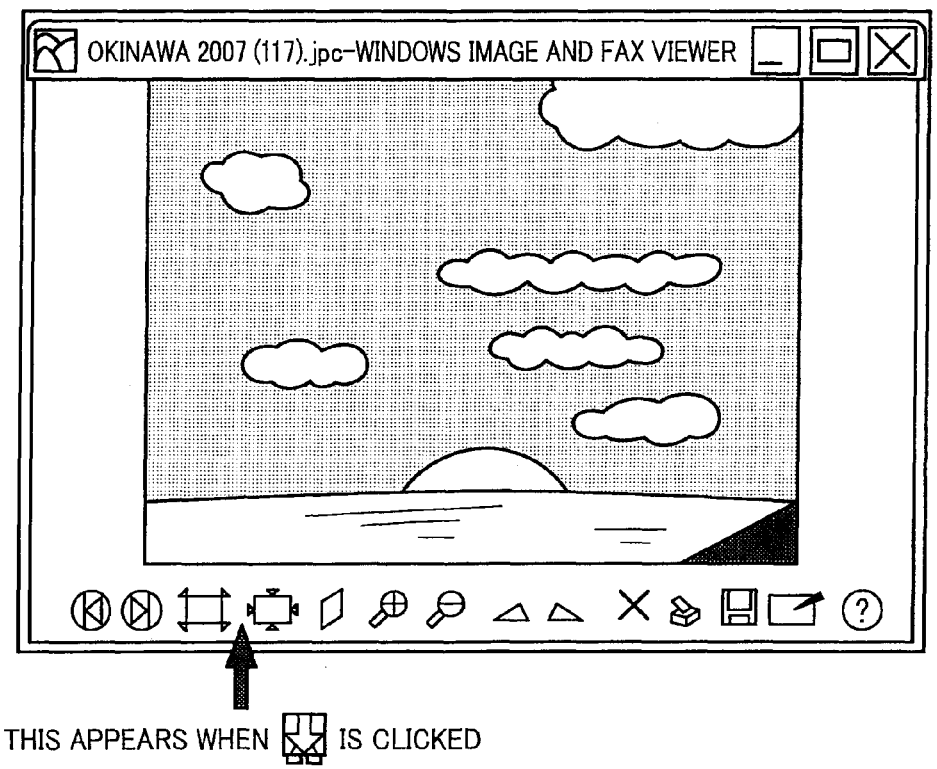

The thus-downloaded original file is displayed by using application software associated with an extension of the original file (FIG. 24E).

Figure 24G:
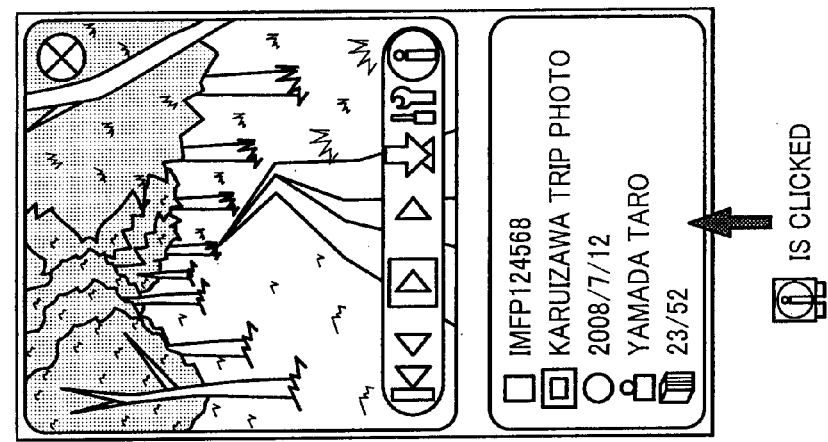
Figure 24F:
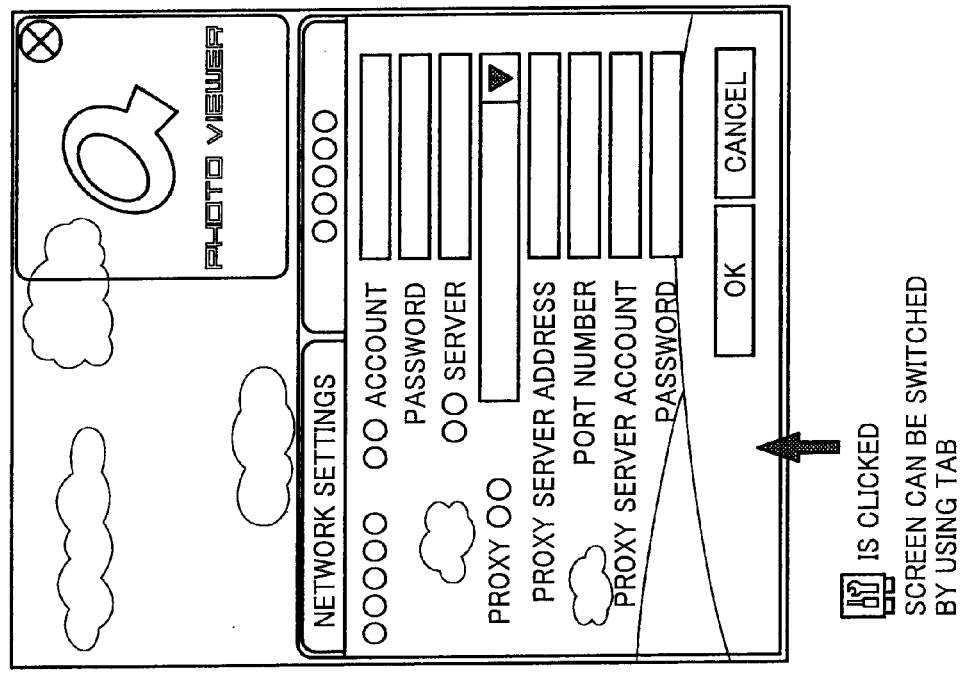

By clicking the button for displaying the settings dialog box in the console window illustrated in the screen 2, a user can cause the settings dialog box to appear (FIG. 24F). This settings dialog box allows a user to change the login settings, the network settings, the slideshow settings, and the like.

By clicking the button for displaying bibliographic information, a user can cause an information window that indicates a file name, a place name, a file date, a nickname of an owner of the place, and slide-number/total-file-count to be displayed below the thumbnail image (FIG. 24G).

A process procedure for creating ContentList.xml by configuring the slideshow settings will be described below.

Figure 25:
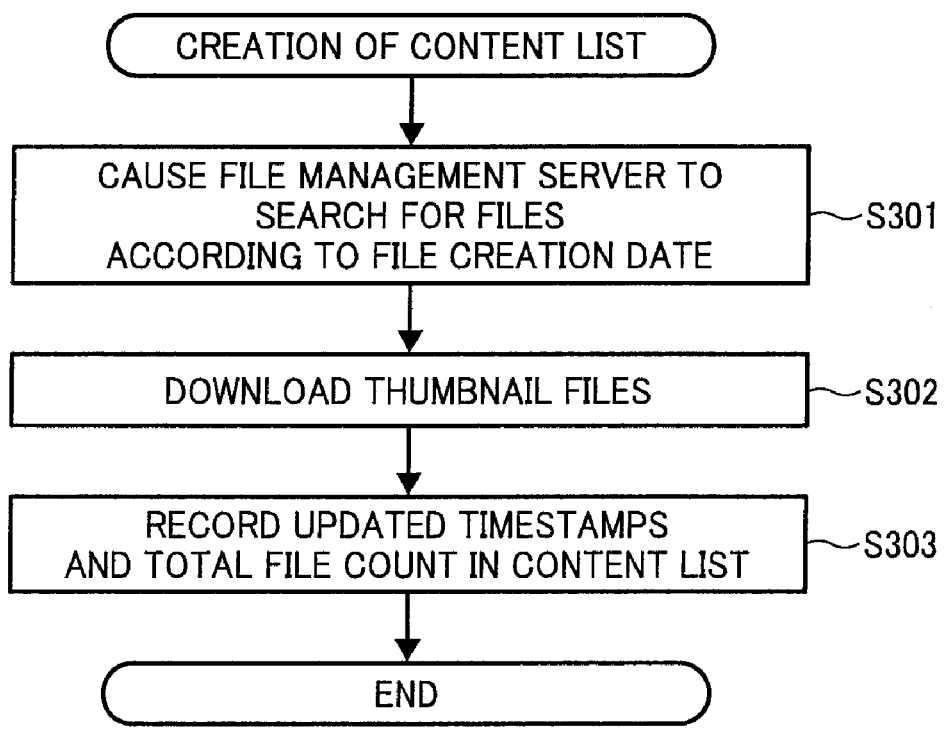
FIG. 25 is a flowchart illustrating a procedure for creating ContentList.xml.

FIG. 25 is a flowchart illustrating the procedure for creating ContentList.xml.

When the slideshow settings are configured by a user, by which a place name and slideshow viewing interval are set, the file management server 400 searches for files registered in the place (specified place) having the place name specified in the slideshow settings according to file creation date (Step S301). More specifically, the file management server 400 searches for files of which extension is any one of "jpg, png, bmp, and gif" among files registered in the specified place in an order sorted in an ascending order of file creation date, and acquires a result (a feed) of this search.

Subsequently, the display control unit 512 (requesting unit) of the client terminal 500 requests thumbnail files based on icon uniform resource locators (URLs) included in entries contained in feeds acquired by the search, thereby sequentially downloading up to, for example, 1,000 thumbnail files (Step S302), and stores the thumbnail files in the cache memory.

When requesting for thumbnail files according to the feed, the display control unit 512 excludes thumbnail files that are already stored in the cache memory from the thumbnail files to be requested. More specifically, when requesting for thumbnail files, the display control unit 512 checks which thumbnail files correspond to icon URLs included in entries contained in the feed and requests only the remainder.

Subsequently, the display control unit 512 acquires, from the feed, updated timestamps and a total file count of the files registered in the specified place and stores the updated timestamps and the total file count in ContentList.xml (Step S303).

Figure 26:
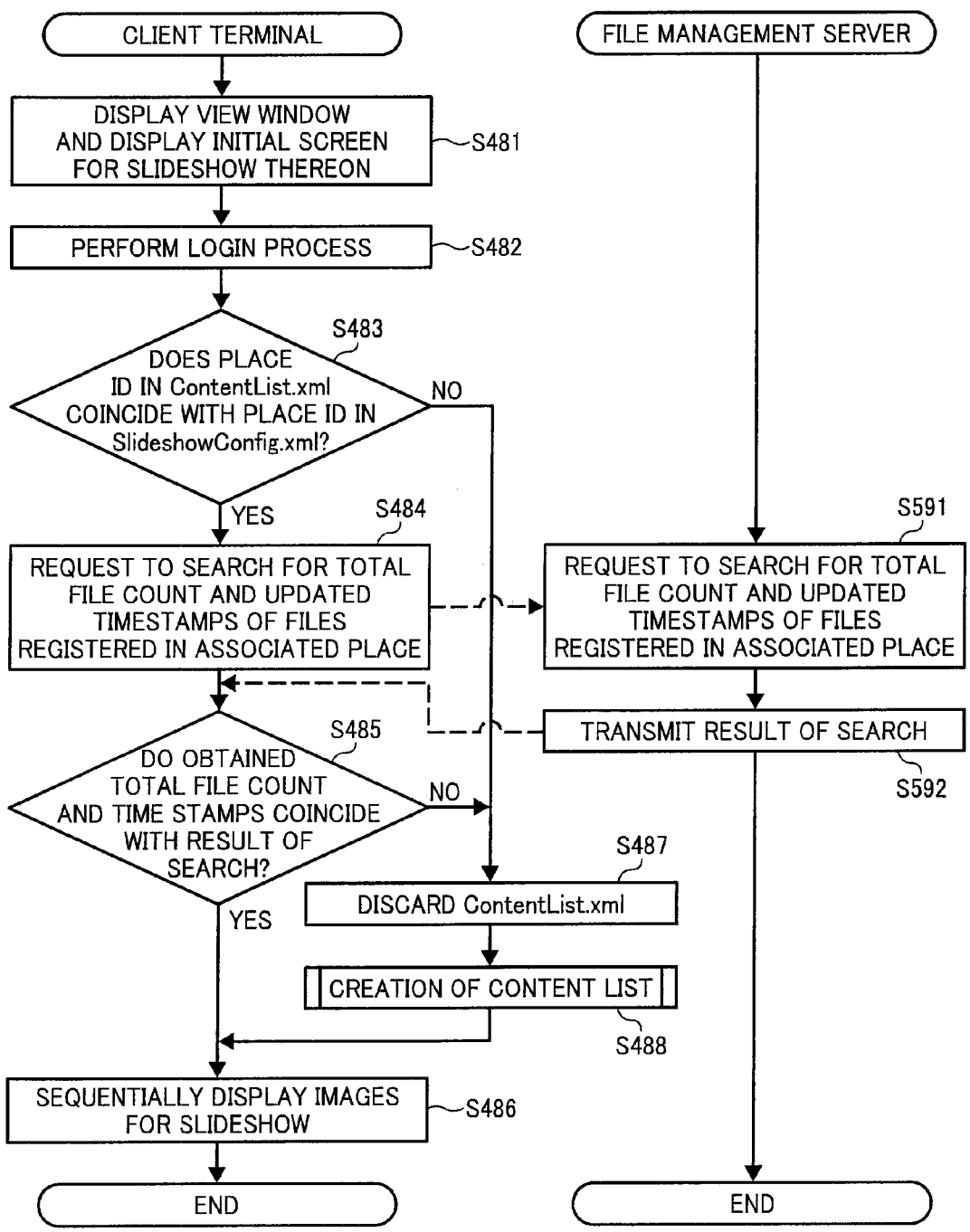
FIG. 26 is a flowchart illustrating a procedure for displaying files registered in a specified place as slideshow by using ContentList.xml created through the procedure illustrated in FIG. 25.

FIG. 26 is a flowchart illustrating a procedure for displaying files registered in a specified place as slideshow by using ContentList.xml created through the procedure illustrated in FIG. 25.

It is assumed that ContentList.xml has been created in advance in this flowchart.

With the client terminal 500, when a user specifies a place and launches software for displaying files registered in this place as slideshow, the display control unit 512 of the client terminal 500 displays the view window for performing the slideshow displaying process, and displays an initial screen (initial screen for slideshow) thereon (Step S481).

In response to an input of a login ID and a password in the login dialog box by a user, the login processing unit 511 of the client terminal 500 illustrated in FIGS. 7A and 7B performs the login process according to contents of UserConfig.dat and CommonConfig.xml, which are files having been configured in advance (Step S482). More specifically, the client terminal 500 verifies the login ID and the password entered by the user against a login ID and a password having been set in advance and makes connection to the file management server 400.

Subsequently, the display control unit 512 determines whether a place ID corresponding to a place name contained in ContentList.xml stored in the storage unit 56 of the client terminal 500 coincides with a place ID corresponding to a place name contained in SlideShow.xml (Step S483).

If they are determined not to coincide with each other (No at Step S483), the place specified in the slideshow settings differs from the place contained in ContentList.xml stored in the storage unit 56; in this case, ContentList.xml is discarded (Step S487) and a new ContentList.xml file associated with the specified place is created through the procedure illustrated in FIG. 25 (Step S488).

In contrast, if a result of determination made by the display control unit 512 at Step S483 is that they coincide with each other (Yes at Step S483), a request for search of a total file count and updated timestamps of files registered in the associated place is transmitted to the file management server 400 to determine whether the place stored in the file management server 400 has been updated (Step S484).

Upon receiving the search request issued at Step S484, the file management server 400 searches for the total file count and the updated timestamps of the files registered in the associated place (Step S591) and obtains a result of the search. More specifically, the file management server 400 searches for files of which extension is any one of "jpg, png, bmp, and gif" among files registered in the specified place in an order sorted according to descending order of file creation date, and obtains a result of this search.

Subsequently, the file management server 400 transmits the result of the search to the client terminal 500 (Step S592).

In the client terminal 500, upon receiving the result of search from the file management server 400, the display control unit 512 determines whether the updated timestamps and the total file count stored in ContentList.xml coincide with the result of the search (Step S485).

If they are determined not to coincide with each other (No at Step S485), the associated place has been updated in the file management server 400; in this case, ContentList.xml is discarded (Step S487) and a new ContentList.xml file associated with the specified place is created through the procedure illustrated in FIG. 25 (Step S488).

In contrast, if a result of determination made at Step S485 is that they coincide with each other (Step S485), the thumbnail files stored in the cache memory are latest ones; therefore, the thumbnail files are read out from the cache memory and images (the thumbnail files) for slideshow are sequentially displayed according to the display order stored in ContentList.xml (Step S486).

Meanwhile, in a case where a slideshow process with the same place specified has been performed before the slideshow process according to the above-mentioned procedure has been performed, the need of creating a new ContentList.xml is eliminated. Because thumbnail files of the specified place are already stored in the cache memory of the client terminal 500, the slideshow can be resumed from the thumbnail file that is displayed at an end of the previous slideshow.

Meanwhile, the thumbnail files of the specified place that are stored in the cache memory can be deleted from the cache memory when the user has been deleted from the member list (member.xml) (see FIG. 3) of the specified place and the user has specified another place.

As described above, the client terminal 500 is capable of downloading thumbnail files representing files registered in a specified place from the file management server 400 and displaying the thumbnail files as slideshow according to a predetermined display condition (display order, display size, and the like). Accordingly, this file management system can be utilized in, e.g., artistic purpose or practical purpose, which leads to an increase in versatility.

Figure 27:
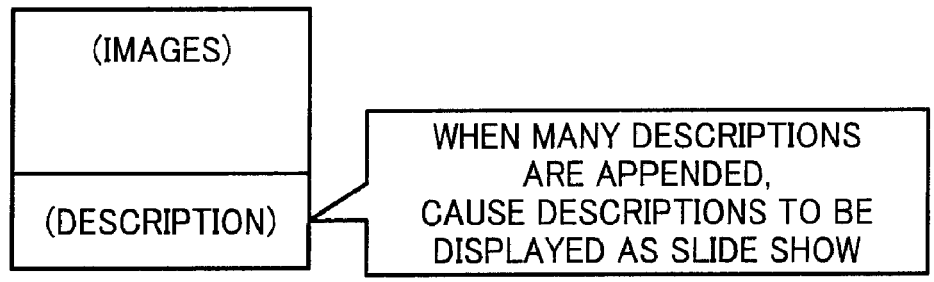
FIG. 27 is a diagram illustrating an example of displaying descriptive data appended to original files in advance as slideshow simultaneously with thumbnail files.

With the client terminal 500 according to the present embodiment, the thumbnail files stored in the file management server 400 are displayed as slideshow; however, entities to be displayed as slideshow are not limited image files. For example, as illustrated in FIG. 27, descriptive information having been appended to an original file in advance can be displayed simultaneously with thumbnail files as slide show, or, alternatively, this descriptive information alone can be displayed as slideshow.

In this case, "display items" are preferably provided in the slideshow settings illustrated in FIG. 24B so that any one of "only images," "images and descriptions," and "descriptions only" can be selected and specified.

According to an aspect of the present invention, with a file management apparatus that displays on a display unit a plurality of symbol images, each of which represents a unit for file management, in a matrix arrangement and that displays, when one of the displayed symbol images is selected, a thumbnail having been associated with the symbol image and registered, file uploading is facilitated.

As discussed above in detail, with the file management system according to the present embodiment, file uploading can be performed by dragging the file rather than selecting the file from a list. Accordingly, files can be handled more intuitively.

With this system, a user can make sense of the progress of uploading visually.

With this system, information generally desired by the user can be added to a to-be-uploaded file.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A file management system comprising:
a plurality of client terminals; and
a file management apparatus that is connected to the plurality of client terminals via a network, wherein
at least one of the client terminals includes:
   a display control unit that displays, on a display screen of a display unit, a display area related to computer program that provides a transmission function;
   a file-information acquiring unit configured to acquire, when a displayed graphical object that represents a file is grabbed by a pointer of an operating device and dragged to and dropped on the displayed area, the file represented by the displayed graphical object and file managing information that is associated with the file; and
   a transmitting unit that transmits the file and the file managing information acquired by the file-information acquiring unit to the file management apparatus, and
the file management apparatus includes:
   a storage unit that stores therein the file and the file management information transmitted from the client terminal, and location information to be used for causing a symbol image of the file management information to be displayed in a matrix arrangement on the display unit; and
   a display control unit that displays the symbol image in a matrix arrangement on the display unit based on the location information.

2. The file management system according to claim 1, wherein
the client terminal further includes a sorting unit that sorts, when a plurality of files and a plurality of pieces of file management information have been acquired by the file-information acquiring unit, the files and the pieces of the file management information based on update date of the files, and
the transmitting unit transmits the files and the pieces of the file management information to the file management apparatus in an order sorted by the sorting unit.

3. The file management system according to claim 1, wherein the file management information is transmitted after being processed such that
when a target file is an image file obtained by using a photographing apparatus, photographed date contained in Exif data of the image file is added to the file management information, and
when the target file is a file other than an image file with Exif data, update date of the target file in the client terminal is added to the file management information.

4. A computer program product comprising a computer-usable medium having computer-readable program codes embodied in the medium for file management in a file management system that includes a client terminal and a file management apparatus, the program codes when executed causing a computer to execute:
displaying on a display screen of a display unit of the client terminal, a display area related to computer program that provides a transmission function;
acquiring, when a displayed graphical object that represents a file is grabbed by a pointer of an operating device and dragged to and dropped on the displayed area, the file represented by the displayed graphical object and file managing information that is associated with the file;
transmitting the file and the file managing information acquired by the file-information acquiring unit to the file management apparatus;
storing, in a storage unit of the file management apparatus, the file and the file management information transmitted from the client terminal, and location information to be used for causing a symbol image of the file management information to be displayed in a matrix arrangement on the display unit; and
displaying the symbol image in a matrix arrangement on the display unit based on the location information.

* * * * *